United States Patent
Gritz

(10) Patent No.: US 7,362,332 B2
(45) Date of Patent: Apr. 22, 2008

(54) SYSTEM AND METHOD OF SIMULATING MOTION BLUR EFFICIENTLY

(75) Inventor: Larry I. Gritz, Berkeley, CA (US)

(73) Assignee: Nvidia Corporation, Santa Clara, CA (US)

( * ) Notice: Subject to any disclaimer, the term of this patent is extended or adjusted under 35 U.S.C. 154(b) by 461 days.

(21) Appl. No.: 10/177,678

(22) Filed: Jun. 20, 2002

(65) Prior Publication Data

US 2003/0234789 A1    Dec. 25, 2003

(51) Int. Cl.
G06T 1/00    (2006.01)

(52) U.S. Cl. .................................... 345/474
(58) Field of Classification Search ............. 345/473
See application file for complete search history.

(56) References Cited

U.S. PATENT DOCUMENTS

| | | | | |
|---|---|---|---|---|
| 4,897,806 A * | 1/1990 | Cook et al. | | 345/426 |
| 5,809,219 A * | 9/1998 | Pearce et al. | | 345/426 |
| 6,088,036 A * | 7/2000 | Morris | | 345/428 |
| 6,426,755 B1 * | 7/2002 | Deering | | 345/581 |
| 6,654,020 B2 * | 11/2003 | Mori | | 345/475 |
| 6,956,576 B1 * | 10/2005 | Deering et al. | | 345/475 |
| 2004/0075663 A1 * | 4/2004 | Plante | | 345/474 |

OTHER PUBLICATIONS

Computer Graphics: Principles and Practice. Foley et al. Addison-Wesley Pub. Co. 1996. p. 660-663; 668-672; 754-756.*
Nick Parlante. Linked List Basics. 2001. http://cslibrary.stanford.edu/103/LinkedListBasics.pdf.*

* cited by examiner

Primary Examiner—Ulka Chauhan
Assistant Examiner—Peter-Anthony Pappas
(74) Attorney, Agent, or Firm—Townsend and Townsend and Crew LLP

(57) ABSTRACT

The present invention is related to rendering computer animated video and/or images generally, and to simulating motion blur efficiently in computer graphics. The present invention includes selecting a plurality of sample locations from which to sample an object scene. If a given sample location overlaps a moving object, existing sample data computed or initialized for the sample location is replicated. This data is then separately updated by sampling the moving object at a plurality of times during the object scene. The replicated data is updated further by subsequently sampling moving and non-moving objects at some or all of the plurality of times. After all of the objects that overlap the sample location have been processed, the replicated data, which may be updated, is combined.

41 Claims, 10 Drawing Sheets

_US 7,362,332 B2_

SYSTEM AND METHOD OF SIMULATING MOTION BLUR EFFICIENTLY

The present invention is related to rendering computer animated video and/or images generally, and to simulating motion blur efficiently in computer graphics specifically.

RELATED APPLICATIONS

This application is related to, and incorporates herein by reference, a U.S. patent application bearing Ser. No. 09/865,990, entitled "SYSTEM AND METHOD OF LINE SAMPLING OBJECT SCENE INFORMATION", and commonly assigned with the present invention. This application is also related to, and incorporates herein by reference, a U.S. patent application Ser. No. 10/157,579, filed on May 28, 2002, entitled "SYSTEM AND METHOD RELATED TO DATA STRUCTURES IN THE CONTEXT OF A COMPUTER GRAPHICS SYSTEM", and commonly assigned with the present invention.

BACKGROUND OF THE INVENTION

A REYES image rendering architecture is a system for computing computer animated video or images. The details of an exemplary REYES image rendering architecture are described in detail by Robert L. Cook, et al. in "The Reyes Image Rendering Architecture", Computer Graphics, vol. 21, no. 4, July 1987, which is incorporated herein by reference. When processed in conjunction with a REYES image rendering architecture compatible renderer (a "REYES renderer"), primitives represent objects that may be included in the computer animated video or images. These primitives are typically diced into polygonal meshes prior to being shaded and projected onto an image plane. After projecting the polygonal meshes onto the image plane, visible polygons are identified. More specifically, the polygons closest to defined elements of the image plane are identified. These elements may comprise infinitesimal points, lines, or areas on the image plane. Color values computed for vertices of the visible polygons are then used to compute color values for the image plane.

To ensure that a sufficient amount of primitive detail is included in the computer animated video or images, each polygon in the polygonal meshes is approximately equal in size to a pixel (e.g., the smallest distinct area of the image plane). Computer animated video or images are represented by an array of numbers. In the case of a two-dimensional image, the array of numbers is a two-dimensional array and each number in the array corresponds to a tiny portion of the image. Each element in the array is referred to as a picture element (or pixel); and the pixel ordinarily has the same location in the array as the portion of the image it represents. In the case of a gray scale image, the numerical value of each pixel represents the relative brightness (or intensity) of the portion of the image to which it corresponds. In the case of a color image, the numerical value of each pixel is a set of numbers (or a vector) representing the color of the portion of the image to which it corresponds. Several different systems are available for numerical representation of colors.

The amount of dicing applied to a primitive is, therefore, dependent upon the size of the primitive relative to a pixel. If the primitive is much larger, for example, a large amount of dicing may be required. Similarly, if the primitive is close in size to the pixel, a relatively small amount of dicing may be required.

Additionally, polygonal meshes produced by a REYES renderer are processed separately so that the REYES renderer need not maintain all of the polygonal meshes in memory or access more than just a subset of the polygonal meshes at any one time. Because of this aspect of a REYES renderer, color values computed for vertices do not typically incorporate global illumination. Persons skilled in the art recognize that global illumination includes accounting for the effects of other primitives in an object scene on a vertex being shaded (e.g., accounting for light reflected off of another primitive onto the vertex being shaded). Instead, a REYES renderer typically shades the vertices with texture maps and other non-global illumination techniques.

Prior art renderers that incorporate ray-tracing ("ray tracing renderers") trace a first set of rays (e.g., "visibility rays") from an imaginary camera or viewer's eye through a position (e.g., a pixel) on the image plane into an object scene. The positions at which the rays intersect the object scene are visible from the image plane. More specifically, a position intersected by a visibility ray is visible from the position on the image plane through which the ray is cast.

Shading the positions at which the rays intersect the object scene typically includes casting a set of rays (e.g., shading rays) from each of the intersection positions. Some or all of the shading rays may intersect other objects in the object scene. Color values computed at positions intersected by shading rays are then used to compute color values for the positions intersected by visibility rays. Ray tracing renderers, therefore, use global illumination to compute color values.

Ray tracing renderers may also dice primitives into polygonal meshes. But polygons included in such polygonal meshes may not include polygons approximately equal in size to a pixel. Instead, the size of the polygons is dependant upon, for example, the curvature of the object modeled by a corresponding primitive. Often times, therefore, polygonal meshes diced from a given primitive for a ray tracing renderer are much less complex than polygonal meshes diced from the same primitive by a REYES renderer. As the complexity of a polygonal mesh decreases, so does the amount of processing time required to determine whether a ray intersects the polygonal mesh.

In both REYES renderers and ray tracing renderers, an object scene is rendered by distributing samples of the object scene in space and time. More specifically, samples are distributed spatially across the image plane. To avoid noticeable image artifacts (e.g., spatial aliasing), the spatial distribution of the samples is typically pseudo or quasi random. Additionally, some REYES renderers and ray tracing renderers split the areas of the image plane that correspond to pixels into non-overlapping sub-pixels. A sample is then distributed within each of these sub-pixels to avoid sample clustering.

Additionally, when film is exposed to an object scene while taking a picture or shooting film, a certain amount of time is required to open and close a shutter that regulates the film's exposure. Because of this amount of time, objects that move while the shutter is open and exposing the film may blur the image captured by the film. This type of blur is known as motion blur, and is a characteristic of pictures and film alike so it is desirable to simulate motion blur in computer animated video or images.

To simulate motion blur, samples distributed across an image plane are also distributed in time that corresponds to an object scene or image frame (e.g., the amount of time the shutter of an imaginary camera stays open). But more samples are required to render an object scene with moving objects, and adequately simulate motion blur, than to render an object scene without moving objects. If enough samples are not used, image artifacts (e.g., temporal aliasing) may be included in generated computer animated video or images. A prior art renderer that uses, for example, sixteen samples per pixel to sample object scenes without moving objects may use thirty-six or more samples per pixel to sample object scenes with moving objects, and adequately simulate motion blur.

But in prior art systems, the decision to allocate additional samples to each pixel to simulate motion blur is made on a scene-by-scene basis in advance of actually rendering an object scene. For example, a person operating the renderer determines that a given object scene or sequence of object scenes warrants additional samples to adequately simulate motion blur. But if additional samples are allocated to one pixel, additional samples are allocated to all pixels. Similarly, these prior art systems lack a mechanism for discriminating between individual pixels that should simulate motion blur (e.g., pixels that overlap moving objects) and those that should not. An exemplary system and method of simulating motion blur inefficiently is described in the United States patent bearing Ser. No. 4,897,806 and entitled "Pseudo-random point sampling techniques in computer graphics".

As a result of the limitations of the prior art, pixels that do not actually overlap moving objects may, nevertheless, be allocated additional samples to simulate motion blur. These additional samples needlessly increase the amount of time and/or processing power required to render an object scene and increase the amount of memory required to store information gathered by these additional samples while the object scene is being rendered.

Because of the inefficiencies of the prior art, a system and method for simulating motion blur efficiently is needed.

SUMMARY OF THE INVENTION

The present invention includes a system and method of forming a view of an object scene from object scene data, which describes objects and their movement during a period of time. The system and method include instructions for and/or the step of selecting a location within a view of the object scene. Also included are instructions for and/or the step of computing a view of the object scene for the location by reference to a first object if the first object overlaps the location and does not move during the period of time. And finally, the system and method include instructions for and/or the step of computing a view of the object scene for the location by reference to the first object for each of a plurality of times at which the first object overlaps the location if the first object moves during the period of time.

The present invention also includes a system and method of sampling objects in an object scene. The objects and their movement during a period of time are described by object scene data. The system and method include instructions for and/or the step of selecting a location from which to sample the object scene data. Also included are instructions for and/or the step of sampling a first object from the location to form a first sample if the first object overlaps the location and does not move during the period of time. And finally, the system and method include instructions for and/or the step of sampling the first object from the location at each of a plurality of times at which the first object overlaps the location to form a plurality of samples if the first object moves during the period of time.

The present invention includes a system and method of forming a view of an object scene from object scene data, which describes objects and their movement during a period of time. The system and method include instructions for and/or the step of selecting a location from which to view the object scene. Also included are instructions for and/or the step of computing a view of the object scene for the location by reference to a first object one time during the period of time if the first object overlaps the location and the first object does not move during said period of time. And finally, the system and method include instructions for and/or the step of computing the view of the object scene for the location by reference to the first object at a plurality of times during the period of time if the first object overlaps the location at the plurality of times and the first object moves during the period of time.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1A:
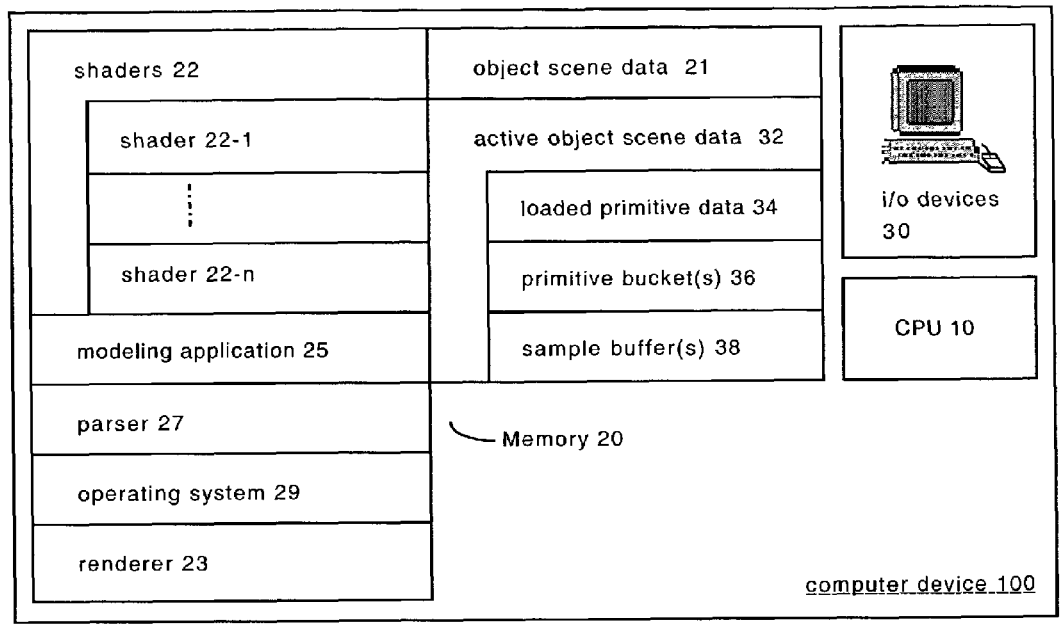
FIG. 1A illustrates a computer device consistent with an embodiment of the present invention.

FIG. 1A shows a computer device 100 configured to execute the various embodiments of the present invention described below. Included in the computer device 100 is a central processing unit (CPU) 10, a memory 20, and i/o devices 30. The CPU 10 executes instructions as directed by the operating system 29 and other programs maintained in the memory 20 and sends control signals to various hardware components included in the computer device 100. The memory 20 typically comprises high speed random access memory as well as non-volatile storage such as disk storage.

Object scene data 21 is typically static information maintained in the non-volatile section of the memory 20. The object scene data 21 may be maintained in any type of data structure (e.g., database, flat file system, etc.) without departing from the scope of the present invention. The object scene data 21 describes one or more object scenes. An object scene is one of many that, for example, comprise the scenes of computer animated video. For example, object scene data 21 may describe the movement and physical or visual attributes of characters, lights, and the environment of the object scene. In particular, and among other things, object scene data 21 specifies object locations and movement within the object scene through the use of one or more sets of coordinate systems. Exemplary coordinate systems are referred to as object space, shader space, work space, camera space, screen space, and raster space. Coordinates of one system may be transformed as needed to any other coordinate system to suit a given task.

Figure 1B:
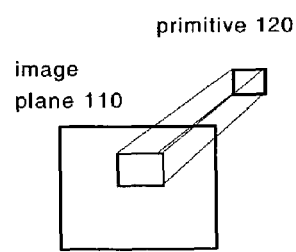
FIG. 1B illustrates the projection of an exemplary primitive on to an image plane in a manner consistent with an embodiment of the present invention.

Screen space typically includes x, y, and z coordinates. The x and y coordinates represent the horizontal and vertical positions with respect to the image plane 110 illustrated in FIG. 1B. The z coordinate represents a distance of, for example, an object from the image plane 110. As illustrated in FIG. 1B, the image plane 110 functions as a projection screen for primitives (e.g., models of objects) 120 included in the object scene. Thus, the image plane 110 facilitates a transformation of three-dimensional objects to a two-dimensional representation. The image plane 110 is analogous to a monitor or video display, and positions on the image plane 110 typically map to positions on a monitor or video display. Thus, references to areas of an image plane 110 are effectively references to pixels of a monitor or video display.

Object scene data 21 also includes, as noted above, information about the movement of the object during a period of time associated with an image frame. This period of time is analogous to the opening and closing of a camera shutter. This information is preferably used to simulate motion blur, which adds to the realism of computer animated video and images. To capture object movement, object scene data 21 provides the position of an object at the beginning of the period of time associated with the image frame and its trajectory and velocity during the image frame. This permits the calculation of a position of the object during the period of time associated with the image frame.

As indicated above, the objects are usually modeled with primitives. For example, a chair may be represented by a plurality of parametric patches or other primitives. Each of these primitives typically include physical properties of the objects they model. For example, a primitive that models a portion of a wooden chair may be configured to interact with light in a manner similar to that of wood.

Note that the term "primitive" used herein may refer to numerous types of geometric primitives such as parametric quadrics, polygons, polyhedra, parametric patches (e.g., NURBS), subdivision surfaces, analytic surfaces, implicit surfaces, constructive solid geometry objects, etc. However, certain steps described herein produce only certain types of primitives and certain steps described herein are trivial for certain types of primitives, but not for others.

Shaders 22 comprise one or more programs called shaders that also describe objects in the object scene. Shaders 22 are executable programs that provide, for example, information about objects in the object scene. Specific examples of shaders 22 include displacement shaders 22, surface shaders 22, light shaders 22, and atmosphere shaders 22. A displacement shader 22 typically offsets a primitive's vertices and surface normals, which are directions perpendicular to the primitive's surface, to adjust the primitive's interaction with light. A surface shader 22 algorithmically describes the appearance of a primitive. A light shader 22 algorithmically describes a light source. Atmosphere shaders 22 are typically used to simulate environmental conditions (e.g., fog, smoke, etc.). Other shaders 22 and shader functionality may also be used without departing from the scope of the present invention.

Also included in the memory 20 is the renderer 23. Renderer 23 is a program that processes object scene data 21, in conjunction with shaders 22, to render computer animated video or images as described in detail below.

Memory 20 may also include one or more modeling applications 25 and parsers 27. A modeling application 25 may create some or all of the object scene data 21. A parser 27 may be used by a modeling application 25 or other program to parse the object scene data 21.

The memory 20 preferably includes active object scene data 32 comprising loaded primitive data 34, one or more primitive buckets 36, and one or more sample buffers 38 as well. Like the object scene data 21, the active object scene data 32 may be maintained in any type of data structure (e.g., database, flat file system, etc.) without departing from the scope of the present invention An area that corresponds to a primitive bucket 36 typically encompasses one or more pixels of a display. As described in more detail below, a renderer 23 typically processes primitives by reference to corresponding primitive buckets 36. The use of primitive buckets 36 permits the renderer 23 to control the number of primitives that are, for example, finely and coarsely diced into grids of polygons at any one time. A primitive may, however, be included in more than one primitive bucket 36 if it overlaps an area of the image plane 110 assigned to more than one primitive bucket 36. The primitive bucket 36 may take the form of an array or linked list. Information about primitives input from the object scene data 21 is, however, preferably maintained in the active object scene data 32. A primitive bucket 36, therefore, is preferably comprised of pointers to specific sections of the active object scene data 32. The renderer 23, furthermore, preferably orders the pointers by reference to the distance of primitives from the image plane 110. This ordering permits the renderer 23 to, for example, efficiently cull primitives that are occluded by one or more other primitives closer to the image plane 110. Despite their many advantages, primitive buckets 36 are not, however, a limitation of the present invention.

Figure 1C:
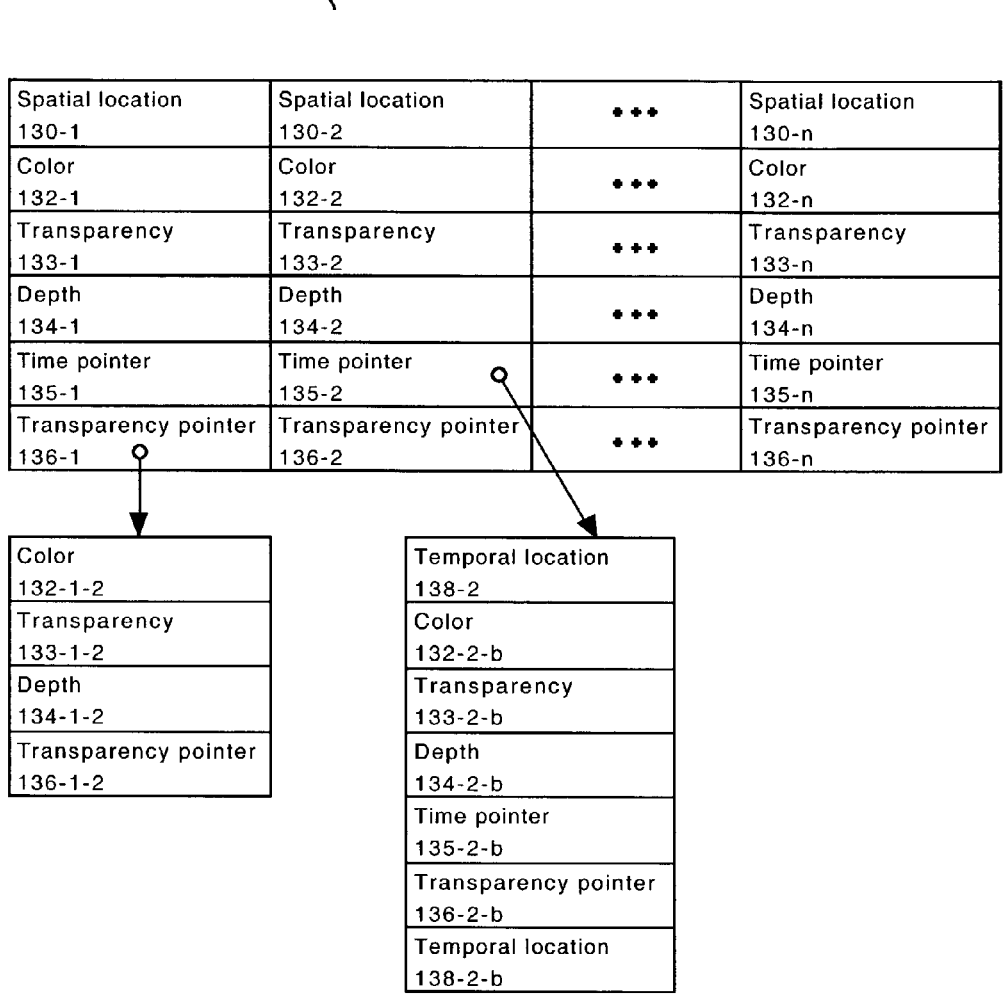
FIG. 1C illustrates a data structure for storing sample data in a manner consistent with an embodiment of the present invention.

Sample buffers 38 typically include an entry for each unique spacial location of samples taken during the hide-visibility-grid step, which is described in detail below. FIG. 1C illustrates a sample buffer 38 consistent with an embodiment of the present invention. As illustrated in FIG. 1C, a sample buffer 38 may comprise an array/linked list combination. Each entry in the sample buffer 38 illustrated in FIG. 1C includes a spatial location field 130, a color field 132, a transparency field 133, a depth field 134, a time pointer field 135, and a transparency pointer field 136. These fields represent a minimum amount of data storage for each unique spacial location (of samples) and are eventually used to compute one or more color values for each sample buffer entry.

As note above, this application is related to, and incorporates herein by reference, the U.S.patent application bearing Ser. No. 09/865,990, entitled "SYSTEM AND METHOD OF LINE SAMPLING OBJECT SCENE INFORMATION", and commonly assigned with the present invention. This incorporated U.S. patent application describes in detail a system and method of distributing line samples spatially (i.e., defining spatial locations of samples) that is within the scope of the present invention. Other techniques may be used for distributing samples (line samples, point samples, area samples, etc.) spatially without departing from the scope of the present invention.

For embodiments (e.g., point sampling embodiments) in which, for example, one color value is ultimately computed (e.g., during step 296 of FIG. 2A) for each spacial location, there may be a one-to-one relationship between sample buffer 38 entries and unique spacial locations. But in other embodiments in which, for example, one or more color values may ultimately be computed for each unique spacial location (e.g., line sampling, area sampling, etc.), several entries of a sample buffer 38 may correspond to an originally defined (e.g., during the initialization step 204 of FIG. 2A) spacial location. More specifically, an entry of a sample buffer 38 may correspond to a portion of an originally defined spacial location instead of the entire spacial location. In point sampling embodiments of the present invention, however, point samples are not subdivided spatially.

In the embodiment illustrated in FIG. 1C, the spatial location fields, the color fields, the transparency fields, the depth fields, the time pointer fields and the transparency pointer fields are included in an array (e.g., a static data structure). This embodiment is optimized for point sampling specifically or sampling in which a single color value may ultimately be computed for each unique spacial location. In this embodiment, the number of sample buffer entries is fixed to the number of unique spacial locations, and thus known in advance.

But in embodiments in which a sample buffer 38 may include entries that correspond to portions of originally defined spatial locations, the number of entries that may be included in a sample buffer is typically not known in advance. In these embodiments, the creation of additional entries is driven by how primitives in an object scene overlap sample locations. If, for example, a primitive overlaps only a portion of a sample location, a new entry in the sample buffer 38 may be created from an existing entry. The new entry may, for example, correspond to the portion of the spatial location overlapped by the primitive, while the existing entry may now, for example, correspond to the portion of the spatial location not overlapped by the primitive. Because this information is not known in advance or prior to rendering an object scene, a linked list may be used more efficiently than an array. In these embodiments, each entry of the sample buffer 38 may include additional pointer fields to store, for example, a pointer to a previous sample buffer entry and a pointer to a next sample buffer entry.

The spatial location field 130 stores the spatial location of one or more corresponding samples (e.g., one or more samples taken at the same spatial location, but at different temporal locations in or times during an object scene or image frame). The contents of this field depend in part upon the particular embodiment. In the case of a point sampling embodiment, the contents may comprise, for example, a set of x and y coordinates that map to the image plane 110. In the case of a line sampling embodiment, the contents may comprise, for example, two sets of x and y coordinates or a set of x and y coordinates, a direction, and a length that map to the image plane 110. And in the case of an area sampling embodiment, the contents may comprise, for example, three or more sets of x and y coordinates.

The color field 132 stores one or more a color values (e.g., sequences of RGB triplets, separate red, green and blue overlays, CMYK values, HSV values, etc.). As described below, the contents of this field may be initialized during step 204 of FIG. 2A to, for example, a background color or the color black. The contents of this field may also be computed and set during step 258 of FIG. 2A. In the case of a point sampling embodiment, the contents may comprise, for example, a single color value. In the case of a line sampling embodiment or an area sampling embodiment, the contents may comprise, for example, a plurality of color values (and possibly interpretive information). For example, the color field 132 may store a first color value that corresponds to a first end of a line sample and a second color value that corresponds to a second end of the line sample. The color field 132 may also store instructions for interpolating or extrapolating these two color values, which may be necessary if a sample buffer entry is split because a primitive overlaps only a portion of the line sample (i.e., corresponding spatial locations, which define the line sample spatially). These instructions enable the renderer 23 to compute color values that correspond to the new ends of the line sample portions.

The depth field 134 stores a depth. As described below, the contents of this field may be initialized during step 204 of FIG. 2A to a maximum distance (so that all primitives or portions of primitives have a depth or distance from the image plane that is less than or equal to the initial value of the depth field). The contents of this field may also be computed and set during step 258 of FIG. 2A. The contents of this field depend upon the particular embodiment. In the case of a point sampling embodiment, the contents may comprise, for example, a single depth for an overlapping primitive or portion of a primitive. In such embodiments, a single depth applies to an entire sample since the sample has no dimensions. In other words, a primitive or portion of a primitive never overlaps just a portion of the spatial location of a point sample. In the case of, for example, a line sampling embodiment, the contents may comprise a plurality of depths (and possibly interpretive information). The spatial location of a line sample may be defined, in some embodiments, by two sets of x and y coordinates. So in these embodiments, each set of x and y coordinates may have a corresponding z coordinate or depth value, which represents a distance of an overlapping primitive or portion of a primitive from the image plane 110. In other words, the depth field may include a depth that corresponds to a first end of a line sample and second depth that corresponds to a second end of the line sample. The depth field 134 may also store instructions for interpolating or extrapolating these two depth values, which may be necessary if a sample buffer entry is split because a primitive overlaps only a portion of the line sample. These instructions enable the renderer 23 to compute depths that corresponds to the new ends of the line sample portions.

The time pointer field 135 stores a pointer to additional data storage required when the corresponding spacial location is sampled at a plurality of temporal locations or times. As described in more detail below, a spatial location that is not overlapped by a moving primitive may have color values, transparency values, and depth values (i.e., color/transparency/depth triplets) applicable to the entire duration of an object scene or image frame. But as also described in more detail below, a spatial location that is overlapped by a moving primitive may have color/transparency/depth triplets that apply only to specific temporal locations or times within an object scene or image frame. Because a primitive or portion of a primitive that overlaps a spatial location is moving, the primitive may overlap a spatial location at one instant, but not at another instant. If so, color/transparency/ depth triplets computed for the spacial location at two instants may be different. Additionally, a moving primitive may overlap a spatial location at two instants, but have a different position, orientation, surface normal, etc. such that color/transparency/depth triplets computed at the two instants may, nevertheless, be different.

In the sample buffer 38 illustrated in FIG. 1C, only the time pointer field 135-2 in the second entry includes a pointer to additional data storage for a color/transparency/depth triplet computed at specific temporal location or time. In other words, only the spatial location defined in the spatial location field 130-2 of the second entry in the sample buffer 38 overlaps or is overlapped by a moving primitive.

And as also illustrated in FIG. 1C, color/transparency/depth triplets were computed for the corresponding spatial location at only two instants. In other words, the time pointer field 135-2-*b* included in the additional data storage does not include a pointer to still more additional data storage. However, in a preferred embodiment, color/transparency/depth triplets may be computed at four temporal locations or times within an object scene or image frame. In other words, three sets of additional data storage, with each set comprising at least a temporal location field, a color field, a transparency field, a depth field, a time pointer field, and a transparency field, may be allocated for an entry in the sample buffer 38. Some embodiments may compute color/transparency/depth triplets at additional or fewer instants when a corresponding spatial location overlaps or is overlapped by a moving primitive.

The color field 132-2-*b*, the transparency field 133-2-*b*, and the depth field 134-2-*b* of the additional data storage may be initialized with values stored in the original color field 132-2, transparency field 133-2, and depth field 134-2, respectively, when, for example, the renderer 23 allocates the additional data storage, which typically coincides with the renderer 23 determining that the corresponding spatial location overlaps or is overlapped by a moving primitive or portion of a primitive. The values in all of the fields corresponding to the second entry in the sample buffer 38 may then be modified or updated by information subsequently computed at specific times.

As noted above, two temporal location fields are included in the additional data storage illustrated in FIG. 1C. Assigning a temporal location or time to a spatial location is not necessary when the spatial location does not overlap moving primitives. The object scene, as viewed from the spatial location does not change significantly during an object scene if the spatial location does not overlap or is not overlapped by a moving primitive during the object scene. As a result, color/transparency/depth triplets computed for such a spatial location are valid for the entire duration of an object scene or image frame. But once the renderer 23 determines that the corresponding spatial location overlaps or is overlapped by a moving primitive, the color/transparency/depth triplet stored in the original color field 132-2, transparency field 133-2, and depth field 134-2 no longer applies to the entire duration of an object scene. Instead, this color/transparency/depth triplet applies only to the spatial location or time stored in the temporal location field 138-2 included in the additional data storage. So the temporal location field 138-2 is preferably created dynamically to reduce memory 20 usage for spatial locations that do not overlap moving primitives or portions of primitives.

Prior to allocating the additional data storage, the time pointer field 135-2 typically stores a NULL pointer. More specifically, when the color, transparency, and depth fields are initialized during step 204 of FIG. 2A, the time pointer field is also preferably initialized to a NULL pointer. The time pointer field may then be set to point to additional data storage, such as that described in the preceding paragraphs, during step 258 of FIG. 2A. Because the time pointer field equals a value other than a NULL pointer only when color/transparency/depth triplets have been computed for specific times during an object scene, this field conveniently indicates whether a spatial location is blurred (e.g., overlaps a moving primitive). Similarly, other newly allocated pointer fields (e.g., the time pointer field 135-2-*b*) are also initialized to NULL.

The transparency pointer field 136 also stores a pointer to additional data storage. But this additional data storage stores and points to one or more color/transparency/depth triplets computed because the corresponding spatial location overlaps or is overlapped by one or more semi-transparent or transparent primitives or portions of primitives. In other words, two or more primitives or portions of a primitive may be visible from a given spatial location. Both of these primitives may be required to compute a final color value for the corresponding spatial location, so color/transparency/depth triplets must be maintained for both.

Note that a given spatial location may not be overlapped by one or more semi-transparent or transparent primitives or portions of primitives at all times during an object scene. As a result, the additional data storage pointed to by the time pointer field 135 includes a separate transparency pointer field 136.

In the sample buffer 38 illustrated in FIG. 1C, only the spatial location of the first entry is overlapped by a semi-transparent or transparent primitive or portion of a primitive. This is clear because only the first entry of the sample buffer includes a pointer in the transparency pointer field 136-1 to additional data storage. Note that this additional data storage also includes a transparency pointer field 136-1-2. This enables the renderer 23 to maintain a plurality of color/transparency/depth triplets for the corresponding spatial locations.

As noted above, this application is related to, and incorporates herein by reference, the U.S. patent application Ser. No. 10/157,579, filed on May 28, 2002, entitled "SYSTEM AND METHOD RELATED TO DATA STRUCTURES IN THE CONTEXT OF A COMPUTER GRAPHICS SYSTEM", and commonly assigned with the present invention. This U.S. patent application describes a data structure (e.g., a specialized sample buffer 38) optimized for storing, retrieving, and updating information in a line sampling embodiment of the present invention. This data structure provides an alternative to the sample buffer 38 illustrated in FIG. 1C, but is within the scope of the present invention.

Loaded primitive data 34 typically includes information about primitives copied from the object scene data 21 and information generated by the renderer 23 while processing primitives.

Attention now turns to a detailed discussion of steps taken, in conjunction with the computer device 100, in preferred embodiments of the present invention to render computer animated video or images.

Figure 2A:
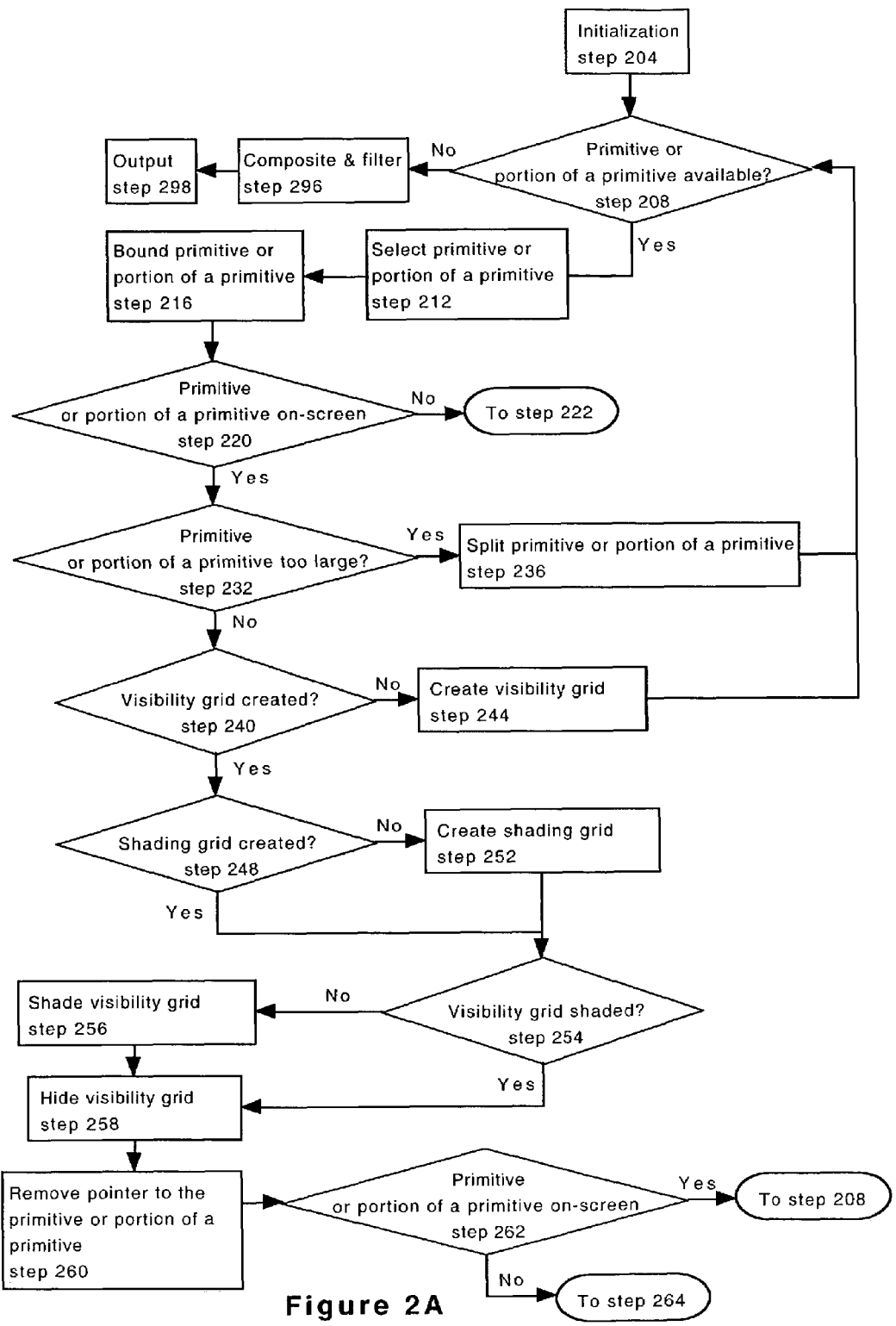
FIGS. 2A, 2B, 2C, and 2D illustrate processing steps for rendering computer animated video or images in a manner consistent with an embodiment of the present invention.

A first step of rendering an object scene is an initialization step (step 204, FIG. 2A). This step may include assigning areas of the image plane 110 to primitive buckets 36 and assigning sample locations to sample buffers 38. This step may also include the renderer 23 initializing the color values of sample buffers 38 to a default background color (e.g., the color black) and depths of sample buffers 38 to a maximum depth value (e.g., to infinity or the greatest distance that can be represented in the depth fields 134).

The renderer 23 then determines whether a primitive is available for processing (step 208). This step may include, for example, the renderer 23 checking for a command from a parser 27 or modeling application 25 to process a primitive from the object scene data 21. In some embodiments, the parser 27 parses sections of the object scene data 21, which may be, or include, a metafile. The parser 27 typically invokes a routine executable by the renderer 23 depending on the particular datum in the object scene data 21 parsed. In other embodiments, the modeling application 25 bypasses the parser 27, processes the object scene data 21, and invokes the appropriate routine executable by the renderer 23 (using, for example, an application program interface of the renderer 23). Essentially, the parser 27 or the modeling application 25 may invoke action by the renderer 23 for each primitive included in the object scene data 21. Additionally, the parser 27 or the modeling application 25 may set attributes and options applicable to a particular primitive. These attributes and options are then applied by the renderer 23 while processing the object scene data 21.

Step 208 may also included the renderer 23 scanning the object scene data 21 and one or more primitive buckets 36 for an available primitive. A primitive is not available from the object scene data 21 if, for example, each primitive defined by the object scene data 21 has been copied into the active object scene data 32. Similarly, a primitive is not available from a primitive bucket if, for example, each primitive assigned to the primitive bucket has been culled and/or subjected to the hide-visibility-grid step.

If a primitive is not available, the renderer 23 composites and filters data stored in the sample buffer 38 (step 296). This step includes combining color values stored in the sample buffer 38 to form a color value for each pixel that defines, for example, a display or image. As indicated above, and described in detail below, a plurality of color values may be maintained for a sample location. Color values (in connection with transparency values and depth values) computed for a given sample location at different times during an object scene or image frame may be combined to form a single color value for the sample location. In preferred embodiments, color values computed at different times are weighted evenly and averaged. Many techniques for combining color values are known in the art, all are within the scope of the present invention. These color values are then output to a display or stored for subsequent use in memory 20 (step 298).

If a primitive is available, the renderer 23 preferably selects a primitive directly from the object scene data 21 or indirectly through a primitive bucket 36 (step 212). In preferred embodiments of the present invention, the renderer 23 selects all of the primitives defined in the object scene data 21 before selecting a primitive (indirectly) from a primitive bucket 36. And when a primitive is selected from the object scene data 21, the renderer 23 preferably adds some or all of the object scene data 21 pertaining to the primitive to the active object scene data 32. More specifically, the renderer 23 adds primitive data to the loaded primitive data 34 and assigns the primitive to one or more primitive buckets 36. Once assigned to a primitive bucket 36, the renderer inserts one or more pointers to the primitive data into the primitive bucket 36.

Additionally, in some embodiments of the present invention, the renderer 23 selects a current primitive bucket 36 and does not process other primitive buckets until no additional primitives are available from the current primitive bucket. Once the current primitive bucket is depleted, a new current primitive bucket is selected.

Another complexity in this process is the possible splitting of primitives. As described in more detail below, a primitive may be split such that a pointer included in a primitive bucket may point to only a portion of a primitive. So when an entry in a primitive bucket is selected by a renderer 23 (e.g., during step 212 described in the following paragraph), the renderer 23 may be selecting a portion of a primitive instead of an entire primitive.

After selecting a primitive or a portion of a primitive (step 212), the renderer 23 bounds the selected primitive or portion of a primitive in a bounding box (step 216). Persons skilled in the art recognize that a bounding box is an imaginary box (e.g., a volume) representing the maximum dimensions of a bound primitive or portion of a primitive. The bounding box permits the renderer 23 to quickly determine whether a primitive or portion of a primitive may occupy certain space in the object scene. It is possible that even if the bounding box does occupy the space, a primitive or portion of a primitive bound by the bounding box may not.

The renderer 23 may bound the selected primitive or portion of a primitive or a representation of the selected primitive or portion of a primitive. If, for example, the selected primitive or portion of a primitive comprises a parametric patch, the parametric patch may be bound. Because of the nature and complexity of such parametric patches, suitable bounding boxes may not tightly follow the contours of the selected primitive or portion of a primitive. How tightly the bounding box follows the contours of the selected primitive or portion of a primitive is a design choice. A bounding box that tightly follows the contours of the selected primitive or portion of a primitive typically requires more processing time for creation than a bounding box that does not tightly follow the contours of the selected primitive or portion of a primitive.

But as described in detail below, a primitive or portion of a primitive may be diced into a grid of polygons (e.g., a representation of a primitive or portion of a primitive). Because a grid of polygons is a relatively simplistic primitive, less processing time is typically required to create a bounding box for a grid of polygons than for primitives or portions of a primitive. As a result, the bounding box created in step 216 preferably bounds a grid of polygons created from the selected primitive or portion of a primitive when such a grid is available (e.g., step 244 has already been executed for the selected primitive or portion of a primitive).

The renderer 23 then determines whether the selected primitive or portion of a primitive is on-screen (step 220). The object scene data 21, and thus the active object scene data 32, typically includes a description of a viewing volume that contains everything that may be visible by an imaginary camera or viewer. If no portion of the bounding box is within this viewing volume, the selected primitive or portion of a primitive is not on-screen. The renderer 23 typically compares coordinates computed for the bounding box to a compatible set of coordinates for the viewing volume to make this determination. Additionally, when the selected primitive or portion of a primitive is within the viewing volume, as indicated by the bounding box, but faces away from the imaginary camera or viewer, the selected primitive or portion of a primitive is not on-screen. The renderer 23 may make this determination, for example, by computing a surface normal for the selected primitive or portion of a primitive. If the surface normal points away from the imaginary camera or viewer, the selected primitive or portion of a primitive faces away from the imaginary camera or viewer. Note that some primitives merely model a surface of an object, so there is no viewable "back side" of such primitives. Primitives that lack a viewable back-side and face away from the imaginary camera or view are not on-screen as well. Further, a primitive may not be on screen if, for example, each sample location overlapped by the bounding box of the primitive is overlapped by another primitive that is closer to the image plane 100 and each of these sample locations is in fact overlapped by another primitive.

In some embodiments, the renderer 23 bounds an entire primitive and determines whether the primitive is on-screen even when only a portion of a primitive is selected. More specifically, the renderer 23 bounds the primitive that includes the selected portion. Note that when subsequent portions of this primitive are selected, the renderer 23 preferably does not bound and retest the entire primitive.

Figure 3:
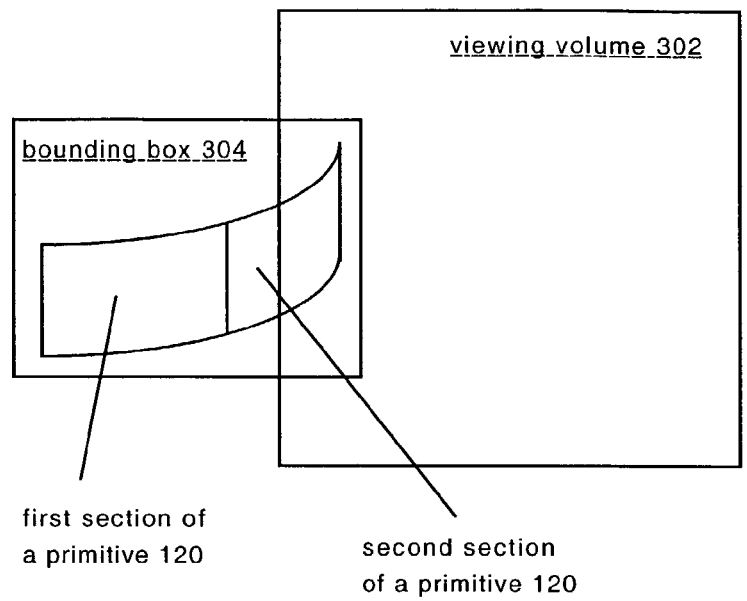
FIG. 3 illustrates a portion of a primitive bounding box overlapping an exemplary viewing volume.

When a portion of a primitive that is on-screen when considered as part of the primitive may not be on-screen when considered alone. As illustrated in FIG. 3, a portion of the bounding box 304 for a primitive overlaps an exemplary viewing volume 302. The primitive illustrated in FIG. 3 includes a line that marks where the primitive 120 may be split during the splitting step described below. The first portion of the primitive 120, as indicated by the line, falls entirely outside of the viewing volume 302. A bounding box for the first portion of the primitive 120 may not, therefore, overlap the viewing volume 302 after being subjected to the splitting step. But the second portion of the primitive, and any bounding box created therefore, will continue to overlap the viewing volume 302 after being subjected to the splitting step.

Figure 2B:
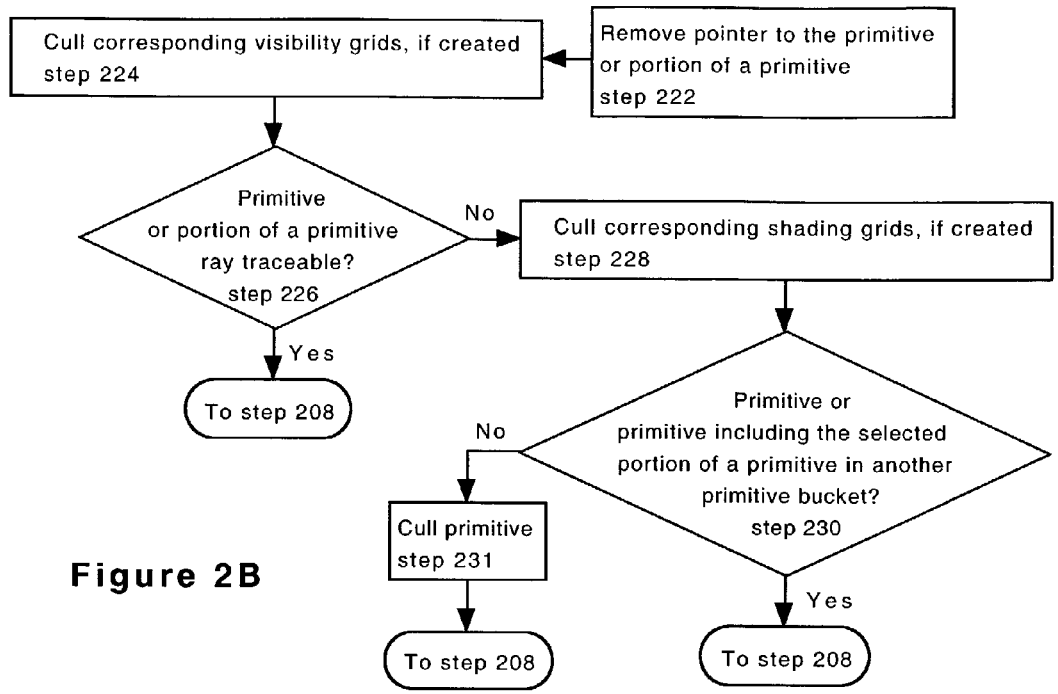
Figure 2C:
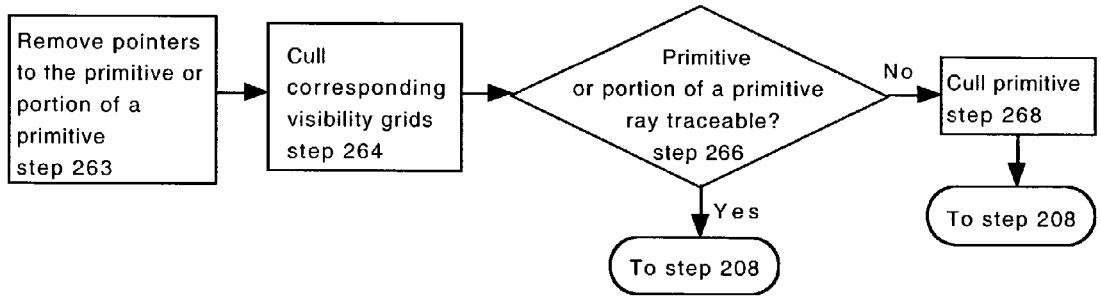

If the renderer 23 determines that the selected primitive or portion of a primitive is not on-screen (step 220-No), the renderer 23 preferably removes the pointer to the selected primitive or portion of a primitive from the primitive buckets 36 (step 222, FIG. 2B). But if the renderer 23 determines in step 220 that the primitive that includes the selected portion is not on-screen, the renderer 23 may remove all pointers to this primitive from the primitive buckets 36.

The renderer 23 then preferably culls corresponding visibility grids, which are described below, from the active object scene data 32 (step 224). At the very least, a visibility grid created for the selected primitive or the selected portion of a primitive is removed. But if the renderer 23 determines in step 220 that the primitive that includes the selected portion is not on-screen, the renderer 23 may remove all visibility grids created for this primitive.

The renderer 23 then determines whether the selected primitive or portion of a primitive is ray traceable (step 226). Note that if a primitive is ray traceable, all of its portions are typically ray traceable as well.

If the renderer 23 determines that the selected primitive or portion of a primitive is ray traceable (step 226-Yes), the renderer 23 returns to step 208 to select another primitive or portion of a primitive. Since the selected primitive or portion of a primitive may be intersected by a ray while the renderer 23 is shading another primitive, data about the selected primitive or portion of a primitive is preferably maintained.

If the renderer 23 determines that the selected primitive or portion of a primitive is not ray traceable (step 226-No), the renderer 23 culls the corresponding shading grid, which is described below, from the active object scene data 32 (step 228). This corresponding shading grid is not needed because there are no visibility grids corresponding to the selected primitive or portion of a primitive that may be shaded and this corresponding shading grid will not be intersected with rays to shade other primitives or portions of a primitive.

The renderer 23 then determines whether the selected primitive or the primitive that includes the selected portion is referenced in any primitive buckets 36 (step 230). If not (step 230-No), the renderer 23 culls data related to the selected primitive or the primitive that includes the selected portion from the active object scene data 32 (except, for example, an indication that the selected primitive or the primitive that includes the selected portion has already been processed) (step 231). This data is no longer needed because the primitive will not be referenced again while processing the active object scene data 32. But if the selected primitive or the primitive that includes the selected portion is referenced in any primitive buckets 36 (step 230-Yes) or after executing step 321, the renderer 23 returns to step 208 to select another primitive or portion of a primitive.

If the selected primitive or portion of a primitive is on-screen (step 220-Yes), the renderer 23 determines whether the selected primitive or portion of a primitive is too large (step 232). As described in more detail below, primitives or portions of a primitive may be subject to a process commonly referred to as dicing, which typically includes dividing a primitive or portion of a primitive, such as a bicubic patch, into a grid of polygons. Often times, a large number of polygons may result from the dicing process. But in preferred embodiments of the present invention, the renderer 23 avoids concurrently processing enough polygons to require excessive use of slower portions of the memory 20 (e.g., disk storage). Instead, the renderer 23 computes or estimates the number of polygons that may result from dicing the selected primitive or portion of a primitive to determine whether the selected primitive or portion of a primitive is too large.

If the selected primitive or portion of a primitive is too large (e.g., too many polygons may result from dicing the selected primitive or portion of a primitive) (step 232-Yes), the renderer 23 splits the selected primitive or portion of a primitive (step 236). For example, if the selected primitive or portion of a primitive is a parametric primitive, such as a NURBS, the renderer 23 identifies parametric lines that divide the selected primitive into two or more smaller NURBS. The renderer 23 then preferably deletes the entry included in the primitive buckets 36 for the selected primitive or portion of a primitive before the split. This entry is replaced with separate entries for each of the two or more smaller NURBS. Each of these entries points to data in the loaded primitive data 34 relating to the selected primitive or the primitive that includes the selected portion, but also identify specific portions of the selected primitive or the primitive including the selected portion. This way, any parameters, options, etc. applicable to the selected primitive or the primitive including the selected portion are, in effect, carried over to the new entries. New entries may then be separately processed by the renderer 23 in connection with steps 208-236 until each entry, and subsequent new entries, points to a portion of a primitive that is both on-screen and small enough for dicing.

If the selected primitive or portion of a primitive is not too large (step 232-No), the renderer 23 determines whether a finely diced or high resolution primitive ("visibility grid") corresponding to the selected primitive or portion of a primitive has been created (step 240).

As noted above, dicing a primitive or portion of a primitive typically produces a grid of polygons. Some grids of polygons that result from dicing are shaded and projected onto the image plane 110. To ensure that complex details of modeled objects are adequately rendered, each polygon shaded and projected onto the image plane 110 is preferably smaller than a pixel, which is the smallest indivisible unit of a monitor or display screen and is assigned only one color. Creating polygons of this size permits separate colors or color values to be computed for each pixel of a display. And in preferred embodiments, the renderer 23 (and shaders 22) computes colors or color values for each vertex that defines a polygon. So in these embodiments, four or more separate colors or color values are computed and combined for each pixel.

Part of the shading process (e.g., the process of computing color values) includes tracing rays for a position on a first primitive into an object scene defined by the object scene data 21. The renderer 23 then computes color values for positions on the same or other primitives intersected by these rays (which may include tracing rays from this position into the object scene in an iterative process). These color values are then used to compute a color value for the position on the first primitive.

Note that in some embodiments of the present invention, view-independent color values computed for positions on primitives intersected by rays are maintained in memory 20 for subsequent use. For example, the intensity of light reflected by diffuse components of a position on a surface is independent of the direction from which the position is viewed. This intensity may then be used, instead of recomputing the intensity from scratch, when a subsequent ray intersects the position or another position within a certain distance from the position.

Because the individual color values computed for primitives intersected by rays traced for the first primitive may not, individually, have a tremendous impact on the first primitive, the primitives intersected need not comprise a grid of polygons in which each polygon is approximately equal in size to a pixel of a display. Additionally, color values computed for primitives intersected by rays traced for the first primitive are computed at the position of the intersection, not surrounding vertices. In other words, the level of detail provided by very small polygons may not be necessary. Additionally, intersecting rays with very small polygons is a more time consuming process than intersecting rays with larger polygons.

Instead, primitives intersected by rays preferably comprise grids of polygons in which each polygon is sized by reference to, for example, the curvature of the object or object portion being modeled by the primitives. Thus, were the object is relatively flat, larger polygons (i.e., low resolution or coarsely diced grids of polygons) are sufficient. And where, the object has a high degree of curvature, smaller polygons (i.e., high resolution or finely diced grids of polygons) are often required to adequately represent the object. In other words, the resolution of a primitive (e.g., a grid of polygons) created for intersecting rays is independent of the primitive's size relative to a pixel. Generally, even objects or object portions with a high degree of curvature will not require polygons smaller than the size of a pixel.

But as indicated above, a primitive may be on-screen (and thus shaded and projected onto the image plane 110) and ray traceable (and thus possibly intersected with rays). As a result, some embodiments of the present invention include the steps of creating two primitives for objects or object portions. A first primitive, if created, may comprise a coarsely diced grid of polygons and be used by the renderer 23 for ray intersecting and shading visibility grids. A primitive for ray intersecting may not, however, be created when a corresponding object or object portion is defined by a relatively simple equation (e.g., a sphere). The renderer 23 is able to compute ray intersections more efficiently with such equations than with a coarsely diced grid of polygons. A second primitive typically comprises a finely diced grid of polygons and is used for shading and projection onto the image plane 110. Although separate primitives are created, the renderer 23 concurrently uses both primitives while rendering an object scene as described in more detail below.

If a visibility grid corresponding to the selected primitive or portion of a primitive has not been created (step 240-No), the renderer 23 finely dices the selected primitive or portion of a primitive to create the visibility grid (step 244). The renderer 23 then returns to step 208 to continue processing available primitives. In other words, an entry for the selected primitive or portion of a primitive is left in one or more primitive buckets 36 for subsequent selection by the renderer 23. In particular, the renderer 23 can create a tighter bounding box for a visibility grid than it can for a selected primitive or portion of a primitive, as described above. So the visibility grid may indicate that the selected primitive or portion of a primitive is not actually on-screen.

Numerous dicing techniques may be used without departing from the scope of the present invention. In one embodiment of the invention, primitives are subjected to a subdivision rule. The details of an exemplary subdivision rule are described in detail by E. Catmull and J. Clark in "Recursively generated B-spline surfaces on arbitrary topological surfaces", Computer-Aided Design 10(6):350-355, November 1978, incorporated herein by reference. In another embodiment, forward differencing is used to evaluate the selected primitive or portion of a primitive at a plurality of positions, which become vertices in the resulting primitive. The details of an exemplary forward differencing process are described in detail by Ari Rappoport in "Rendering Curves and Surfaces with Hybrid Subdivision and Forward Differencing", ACM Transactions on Graphics, 10(4):323-341, October 1991, incorporated herein by reference.

If a visibility grid corresponding to the selected primitive or portion of a primitive has been created (step 240-Yes), the renderer 23 determines whether a coarsely diced or low resolution primitive ("shading grid") corresponding to the selected primitive or portion of a primitive has been created (step 248). If not (step 248-No), the renderer 23 coarsely dices the selected primitive or portion of a primitive to create the shading grid (step 252).

In some embodiments of the present invention, rays are cast from shading grids while shading a corresponding visibility grid. In these embodiments, therefore, a shading grid is always created for primitives or portions of a primitive on-screen. But in other embodiments of the present invention, a shading grid is created only if a corresponding primitive or portion of a primitive is ray traceable. In these embodiments, rays are cast directly from the visibility grid while shading the visibility grid. In either embodiment, however, rays cast are preferably intersected only with shading grids (note that a ray cast from a visibility grid may intersect itself), so a shading grid may be created for the selected primitive or portion of a primitive either way. But in the embodiments in which rays are cast directly from the visibility grid while shading the visibility grid, the creation of a corresponding shading grid is delayed at least until it is determined that a ray intersects a bounding box of the selected primitive or portion of a primitive.

The renderer 23 then determines whether the visibility grid corresponding to the selected primitive or portion of a primitive has been shaded (step 254). If the visibility grid corresponding to the selected primitive or portion of a primitive has not been shaded (step 254-No), the renderer 23 (and the shaders 22) shades the visibility grid (step 256).

This step may include the renderer 23 evaluating displacement shaders 22, surface shaders 22, light shaders 22, and atmosphere shaders 22 for the vertices of the visibility grid and the shading grid. During these evaluations, the shaders 22 may compute color values, offset the positions of vertices, and/or modify the surface normals of primitives.

As noted above, surface shaders algorithmically describe the appearance of a primitive. This may include accounting for direct and indirect (i.e. reflected) light that shines on a primitive and how this light appears to an imaginary camera or viewer. Direct lighting is light produced by a light source that shines directly onto a primitive. Indirect lighting is light produced by a light source that is first reflected off of, or refracted through, another primitive before it shines on a primitive.

The surface of an object (and thus the primitive that models it) typically has both diffuse and specular components. As a result, both components must be accounted for when considering the interaction of light with a primitive. Persons skilled in the art recognize that light that strikes a primitive with a diffuse component is scattered equally in all directions by the diffuse component. The intensity of the reflected light is proportional to the cosine of the angle between the direction of the light that strikes the primitive and the primitive's surface normal. Specular components of a primitive, such as plastic, are responsible for shiny highlights. The intensity of light reflected by specular components of a surface is proportional to the cosine of the angle between the direction of the specular reflection and the direction of the light that strikes the primitive.

In some embodiments of the present invention, the intensity of direct light reflected by diffuse components of a primitive is given by the following equation:

$$I_{dd}=(kd*lp/(d*d))*N \cdot L,$$

where $I_{dd}$ is the intensity of direct light diffusely reflected by the primitive where kd is the primitive's diffuse coefficient of reflection;

where lp is the intensity of the light source shining on the primitive;

where d is a distance from the primitive to the light source;

where N is the primitive's surface normal; and where L is the direction to the light source shining on the primitive.

In some embodiments of the present invention, the intensity of indirect light reflected by diffuse components of a primitive is given by the following equation:

$$I_{id}=ka*Ia$$

where $I_{dd}$ is the intensity of indirect light diffusely reflected by the primitive where ka is the primitive's diffuse coefficient of reflection; and where Ia is the intensity of ambient light in the object scene.

In some embodiments, ambient light is an estimated constant for all primitives. But in other embodiments of the present invention, ambient light is computed with radiosity or irradiance caching. A technique for explicitly computing diffuse interreflection in an object scene with radiosity is described in detail by Cohen et al. in "A Radiosity Solution for Complex Environments," Computer Graphics, vol. 8, no. 3, July 1985, pp. 31-40 and "An Efficient Radiosity Approach for Realistic Image Synthesis," IEEE Computer Graphics and Applications, vol. 6, no. 2, March 1986, pp. 26-35, which are hereby incorporated by reference. A technique for computing diffuse interreflection in an object scene with irradiance caching is described in detail by Gregory Ward et al. in "A Ray Tracing Solution for Diffuse Interreflection," Computer Graphics, Vol. 22, No. 4, August 1988, which is hereby incorporated by reference. This last technique is expanded upon by Gregory Ward and Paul Heckbert in "Irradiance Gradients," Eurographics Rendering Workshop, May, 1992, pp. 85-98, which is also hereby incorporated by reference.

In some embodiments of the present invention, the intensity of direct light reflected by specular components of a primitive viewed from a specific direction is given by the following equation:

$$I_{ds}=(ks*lp/(d*d))*(L \cdot R)^n,$$

where $I_{ds}$ is the intensity of direct light specularly reflected by the primitive;

where ks is the primitive's diffuse coefficient of reflection;

where lp is the intensity of the light source shining on the primitive;

where d is a distance from the primitive to the light source;

where L is the direction to the light source;

where R is the direction of specular reflection; and where n an approximated factor that approaches one for dull surfaces and infinity for shiny surfaces.

In some embodiments of the present invention, the intensity of indirect light reflected by specular components of a primitive is given by the following equation:

$$I_{is}=Kr*R+Kt*T$$

where $I_{is}$ is the intensity of indirect light specularly reflected by the primitive;

where Kr is the primitive's specular coefficient of reflection;

where R is the intensity of light computed for a (reflection) ray cast from the primitive;

where Kt is the primitive's specular coefficient of refraction; and where T is the intensity of light computed for a (refraction) ray cast from the primitive.

Other techniques may be used to model the interaction of light with primitives, and all such techniques are within the scope of the present invention.

As noted above, computing colors and/or color values typically includes casting rays in the object scene to compute the intensity of direct and indirect light that shines on the primitive. Indirect light that shines on the selected primitive or portion of a primitive is reflected from another object in the object scene.

To facilitate the computation of the intensity of indirect light, rays are cast for the visibility grid being shaded into the object scene. Rays may be cast from the visibility representation or a corresponding shading grid depending on the embodiment in use or instructions included in the object scene data 21. The object scene data 21 may specify, for example, that a displacement shader is attached to a primitive and thus always applied to a corresponding visibility grid during the shading step. The object scene data 21 may further specify, for example, that the effect of the displacement shader is significant such that rays must be cast directly from a visibility grid (even in embodiments that would otherwise cast rays from a corresponding shading grid).

Figure 4:
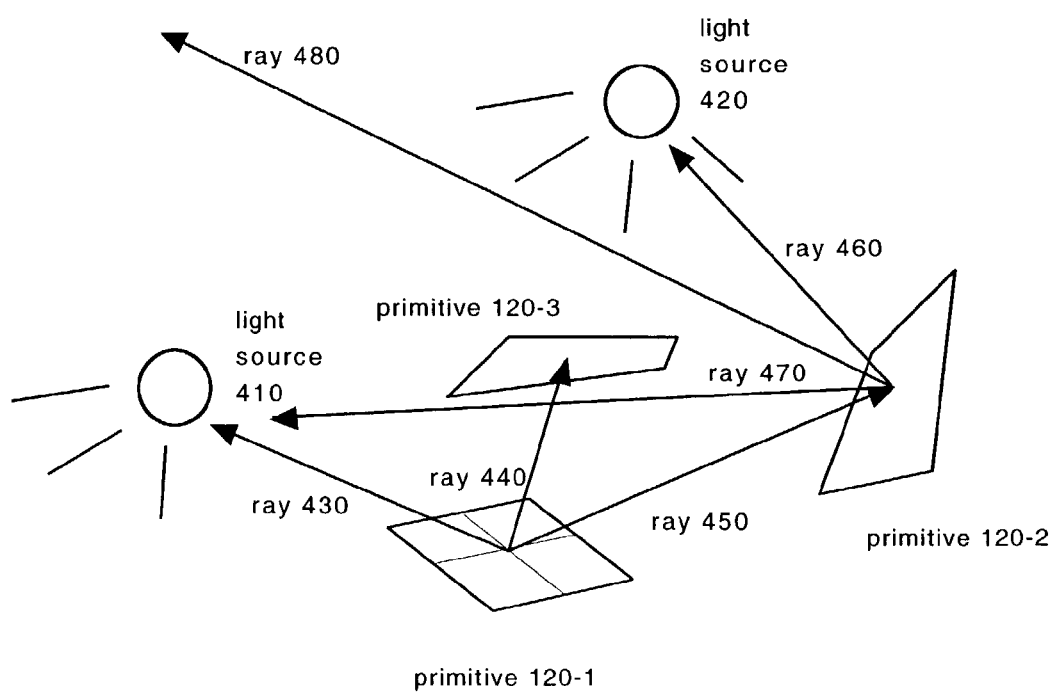
FIG. 4 illustrates ray tracing in a simplified object scene in a manner consistent with an embodiment of the present invention.

FIG. 4 illustrates ray tracing in a very simplistic object scene. Included in FIG. 4 are two light sources 410, 420, six exemplary rays 430, 440, 450, 460, 470, 480 a first primitive 120-1, second primitive 120-2, and a third primitive 120-3. In this illustration, a vertex of the first primitive 120-1 is being shaded. To do so, separate rays 430, 440 are cast towards the first and second light sources 410, 420, respectively, and a ray 450 is cast (possibly randomly) into the object scene. The first light source 410 is intersected by a ray 430, so it shines light onto the vertex being shaded (e.g., provides a color value for the vertex). The second light source, however, is not intersected by a ray 440. Instead, the ray 440 cast towards the second light source is blocked by the third primitive 120-3. As a result, the vertex being shaded is in a shadow cast by the second light source 420 and the third primitive 120-3 (e.g., they too provide a color value for the vertex). The third ray cast, ray 450, intersects the second primitive 120-2. The renderer 23 (and shaders 22) responds to this intersection by casting additional rays 460, 470, 480 from this intersection. Two of these rays 460, 470 are cast towards, and intersect, the first and second light sources 410, 420 respectively. These intersections provide color values for the ray intersection on the second primitive 120-2 (e.g., the origin of the rays 460, 470). A third ray, ray 480, cast from the second primitive 120-2 does not intersect any of the primitives illustrated in FIG. 4. When this occurs, a background color value is typically assigned to the ray (e.g., to the origin of the ray). The color values computed for the rays 460, 470, 480 cast from the second primitive 120-2 are then used to compute a color value for the intersection of the ray 450 cast from the first primitive and intersected with the second primitive 120-2. This color value is then used along with the color values computed for the other two rays 430, 440 cast from the first primitive 120-1 to compute a color value for the vertex being shaded.

Note that the rays 460, 470, 480 cast from the second primitive 120-2 may be thought of as secondary rays since they are used to compute a color value for the intersection of another ray and a primitive. Each color value computed for these rays typically has less of an effect on the vertex being shaded than, for example, the rays cast directly from the vertex being shaded.

Figure 5A:
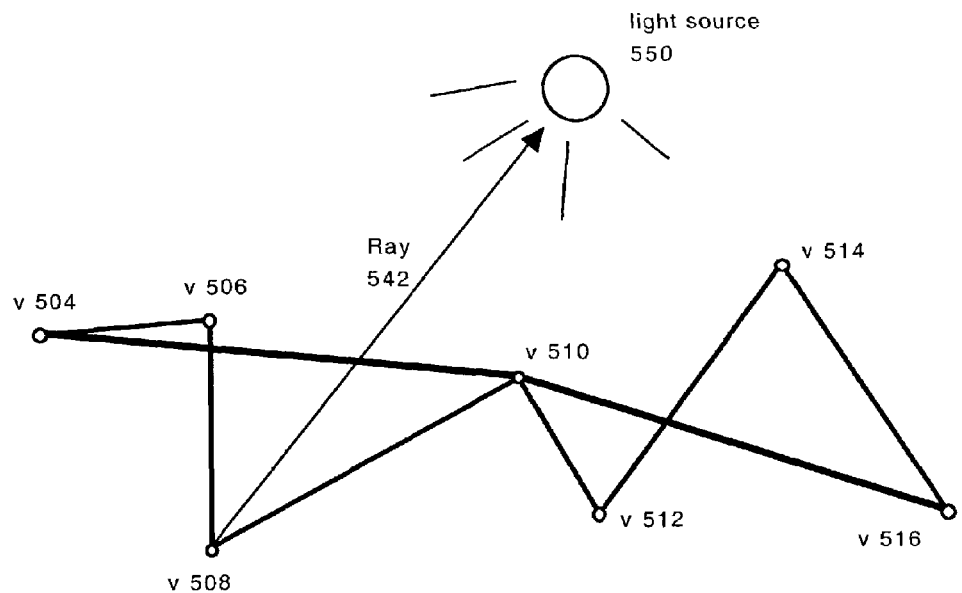
FIGS. 5A and 5B illustrate problems that may arise when tracing rays into an object scene for a finely diced grid of polygons.
Figure 5B:
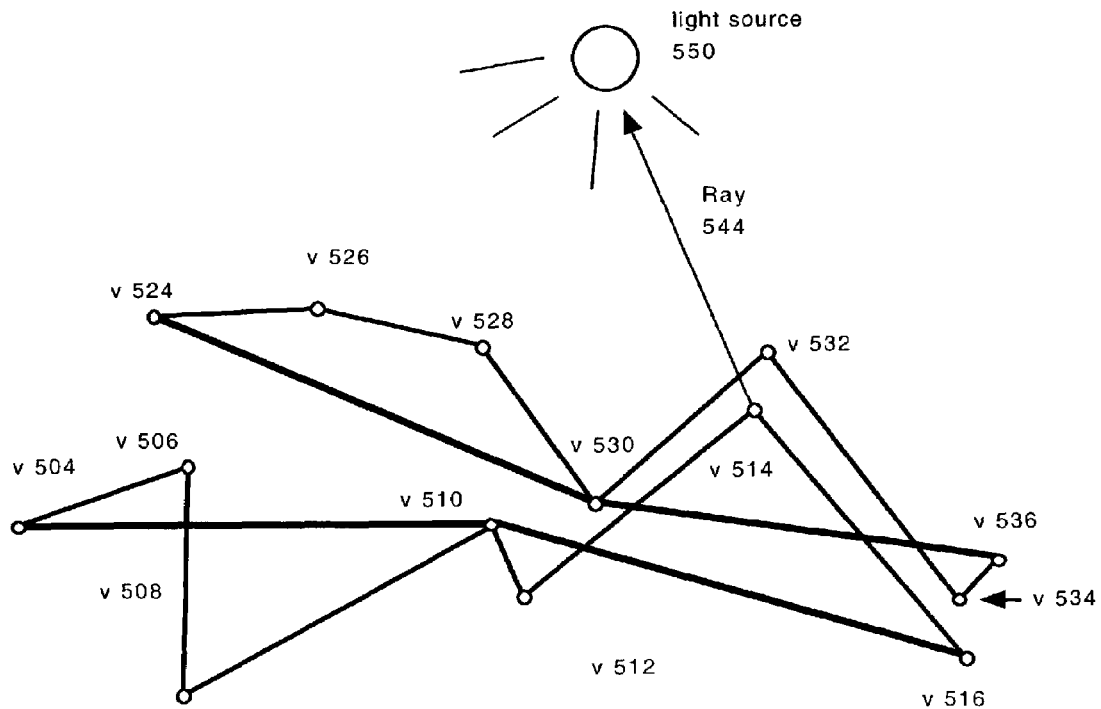

Without taking certain precautions described below, problems may result from tracing rays directly from a visibility representation for intersection with, for example, a shading representation (as noted above, rays may be intersected directly with objects or object portions defined by a relatively simple equation). FIGS. 5A and 5B illustrate typical problems. FIG. 5A includes a light source 550 and elements of a shading grid and a visibility grid are defined by vertices v 504, v 506, v 508, v 510, v 512, v 514, and v 516. These vertices are connected by thin edges (e.g., edges of a polygon). A subset of these vertices, including vertices v 504, v 510, and v 516, define the elements of the shading grid and are connected by thick edges. Note that only some embodiments of the present invention use shading and visibility grids that share vertices.

Ray 542 is shown being projected from vertex v 508 of the visibility grid. The path of the ray 542 illustrated in FIG. 5A shows that the ray intersects with an edge of the shading grid. This sort of inter-object intersection is often invalid and capable of producing perceivable image artifacts. In this example, the ray 542 would otherwise intersect the light source 550, which would shine light on the vertex v 508. Instead, the vertex v 508 is invalidly in the shadow of the shading grid.

FIG. 5B includes the items illustrated in FIG. 5A and elements of a second shading grid and a second visibility grid. The elements of the second visibility grid are defined by vertices v 524, v 526, v 528, v 530, v 532, v 534, and v 536. These vertices are connected by thin edges (e.g., edges of a polygon). A subset of these vertices, including vertices v 524, v 530, and v 536, define the elements of the second shading grid and are connected by thick edges.

As illustrated in FIG. 5B, the (first) visibility grid overlaps the second shading grid. As a result, the exemplary ray 544 cast from the vertex v 514 does not intersect the second shading grid as it should. And again, in preferred embodiments of the present invention, rays are intersected only with coarse representations of objects so the ray 544 does not intersect the second visibility grid either. Because the ray 544 does not intersect the second shading or visibility grid, the ray 544 intersects the light source 550, which shines light on the vertex v 514.

But as indicated by the second visibility grid, which is typically more representative of that actual shape and position of a modeled object than a shading grid, the vertex v 514 should be in a shadow of the object modeled by the second shading and visibility grids. But the light source 550 invalidly shines on the vertex v 514.

Embodiments of the present invention include numerous techniques for addressing the problems illustrated in FIGS. 5A and 5B, two of which are described in detail below. In one embodiment of the present invention, origins of rays, such as ray 542 and ray 544, are moved from a visibility grid to a shading grid.

Figure 5C:
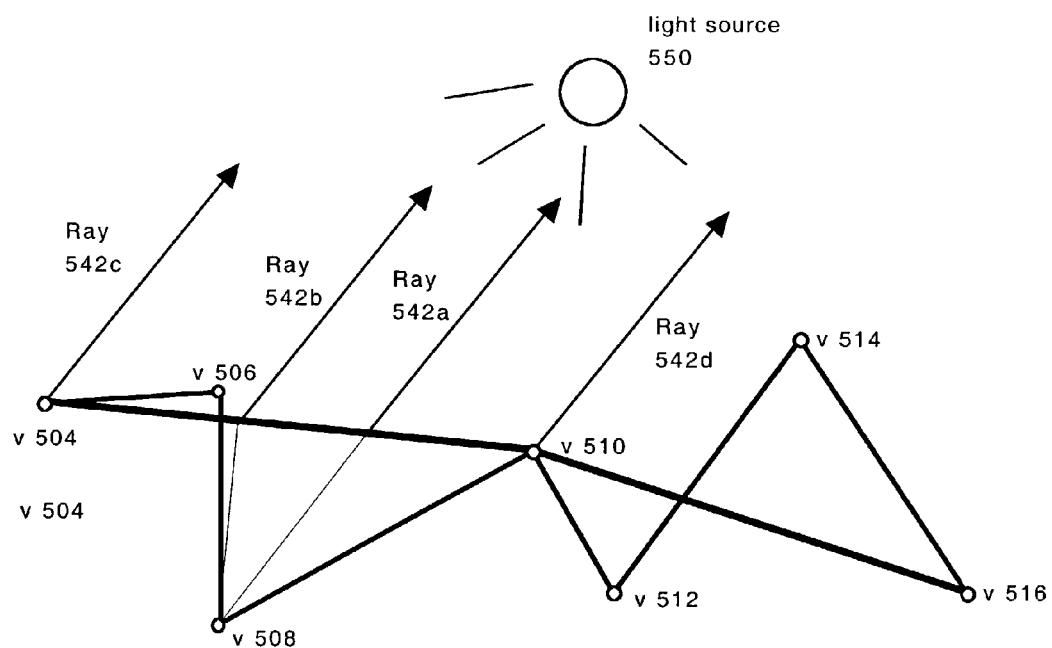
FIGS. 5C, 5D, 5E, and 5F illustrate solutions, which are consistent with embodiments of the present invention, for the problems illustrated in FIGS. 5A and 5B.

FIG. 5C illustrates ray 542 after its origin is moved to four exemplary positions on the shading grid. One position is illustrated by ray 542a. The origin of ray 542a, as indicated by the thin black line, is located at the intersection of the original ray, ray 542, and the shading grid. In some respects, this is the most accurate ray origin since ray 542a will intersect what ray 542 would have intersected. But this is not always possible since a shading grid and a visibility grid may not overlap in this fashion.

Another position is illustrated by ray 542b. The origin of ray 542b is located at a position on the second shading grid that is closest to the vertex v 508. A thin black line, which is perpendicular to the edge connecting vertices v 504 and v 510 and intersecting both the vertex v 508 and the origin of ray 542b, is included in FIG. 5C to illustrate that the origin of ray 542b is the position on the second primitive that is closest to the vertex v 508.

Also illustrated in FIG. 5C are rays 542c and 542d. These rays illustrate slight variations of the strategies discussed in the preceding two paragraphs. The origin of ray 542c is the vertex v 504, which is the vertex on the shading grid that is closest to the vertex v 508 and the origin of the ray 542b (the position on the shading grid closest to the vertex v 508). The origin of ray 542d is the vertex v 510, which is the vertex of the shading grid that is closest to the intersection of the shading grid and the path of the ray 542. In certain situations, however, mapping ray origins to vertices on a shading grid may be problematic. Consider a situation where a primitive models a large flat surface. A shading grid derived from such a primitive may comprise a very small number of vertices over a relatively large area. But a visibility grid derived from such a primitive may comprise a very large number of vertices because of the size of the surface in relation to a pixel area. This situation may, therefore, result in image artifacts due do a large number of ray origins being mapped to a small number of vertices and the offset of the ray origins from their original positions being great.

Figure 5D:
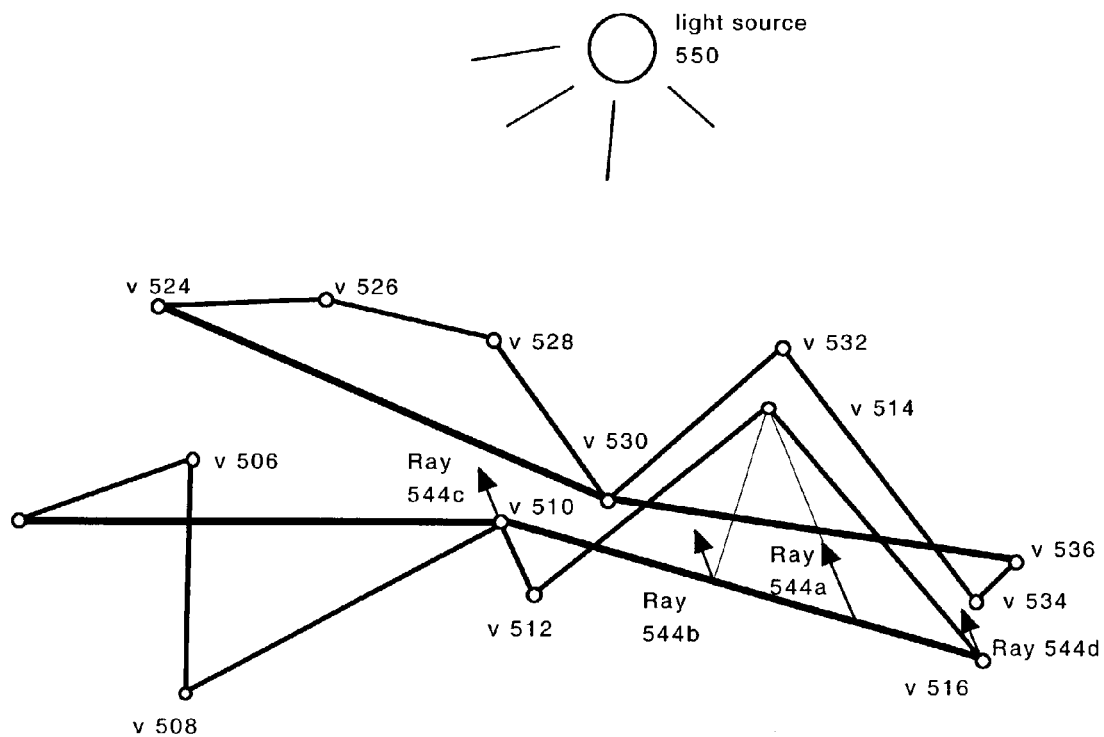

FIG. 5D illustrates ray 544 after its origin is moved to four exemplary positions on the (first) shading grid. One position is illustrated by ray 542a. The origin of ray 542a, as indicated by the thin black line, is located at the intersection of the ray 544 (if traced towards the first shading grid) and the first shading grid.

Another position is illustrated by ray 542b. The origin of ray 542b is located at a position on the first shading grid that is closest to the vertex v 514. A thin black line, which is perpendicular to the edge connecting vertices v 510 and v 516 and intersects both the vertex v 514 and the origin of ray 542b, is included in FIG. 5D to illustrate that the origin of ray 542b is the position on the first shading grid closest to the vertex v 514.

Also illustrated in FIG. 5D are rays 542c and 542d. These rays illustrate slight variations of the strategies discussed in the preceding two paragraphs. The origin of ray 542c is the vertex v 510, which is the vertex on the first shading grid that is closest to the vertex v 514 and the origin of the ray 542b (the position on the first shading grid closest to the vertex v 514). The origin of ray 542d is the vertex v 516, which is the vertex on the first shading grid that is closest to the intersection of the shading grid and the path of the ray 544 (if traced towards the first shading grid).

As a result of the ray origin shifting illustrated in FIGS. 5C and 5D, the ray 542 will not invalidly intersect the first shading grid and the ray 544 will not invalidly bypass the second shading grid. While these techniques may introduce a certain amount of inaccuracy into a resulting image, they provide an improvement over prior art since any such inaccuracy is less than that caused by invalid inter-object intersections.

Figure 5E:
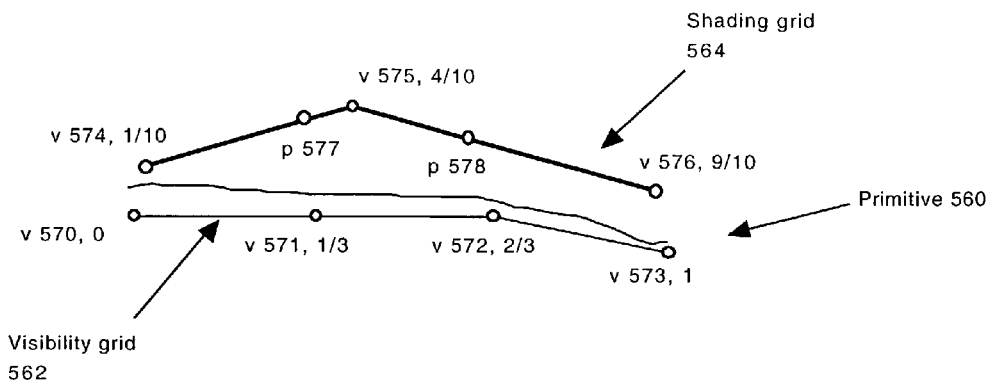

In preferred embodiments, parameters of parametrically defined primitives (e.g., NURBS) are used to compute positions on shading grids corresponding to vertices of visibility grids. When a primitive is defined parametrically, the vertices of a corresponding visibility grid and a corresponding shading grid include parameters associated with a specific position on the primitive. Consider the illustration of FIG. 5E, which includes the curved surface of primitive 560 (thinnest line), a visibility grid 562 corresponding to the primitive 560, a shading grid 564 (thickest lines) corresponding to the primitive 560, vertices v 570, v 571, v 572, v 573, v 574, v 575, v 576, position p 577, and position p 578. As indicated in FIG. 5E, vertices v 570, v 571, v 572, v 573, v 574, v 575, and v 576 have exemplary parametric values equal to 0, 1/3, 2/3, 1, 1/10, 4/10, and 9/10 respectively. Additionally, vertices v 570, v 571, v 572, and v 573 define the visibility grid 562 and vertices v 574, v 575, and v 576 define the shading grid 564. The parametric values are derived from a common source, the primitive 560, so these values are used to compute positions on the shading grid 564 that correspond to positions (e.g., vertices) on the visibility grid 562.

To compute, for example, a position on the shading grid 564 that corresponds to the vertex v 571, the renderer 23 first locates vertices on the shading grid 564 that encompass the parametric value of vertex v 571. As noted above, vertex v 571 has a parametric value of 1/3. Vertices v 574 and v 575, therefore, encompass vertex v 571. The equation for computing the corresponding position is as follows p=(t−t0)/(t1−t0), where t is the parametric value of the vertex (or other position) on the visibility grid, t0 is the parametric value of a first of two vertices on the shading grid that encompass parametrically the vertex on the visibility grid, t1 is the parametric value of a second of two vertices on the shading grid that encompass parametrically the vertex on the visibility grid, and p is the position on the edge or line connecting the two vertices on the shading grid that encompass parametrically the vertex on the visibility grid. In this example, p=(1/3−1/10)/(4/10−1/10)=7/9. The position p 577 on the edge or line that connects vertices v 574 and v 575 illustrates the result of this calculation.

To compute, for example, a position on the shading grid 564 that corresponds to the vertex v 572, the renderer 23 first locates vertices on the shading grid 564 that encompass the parametric value of vertex v 572. As noted above, vertex v 572 has a parametric value of 2/3. Vertices v 575 and v 576, therefore, encompass vertex v 572. The equation for computing the corresponding position is again p=(t−t0)/(t1−t0). In this example, p=(2/3−4/10)/(9/10−4/10)=8/15. The position p 578 on the edge or line that connects vertices v 575 and v 576 illustrates the result of this calculation.

Figure 5F:
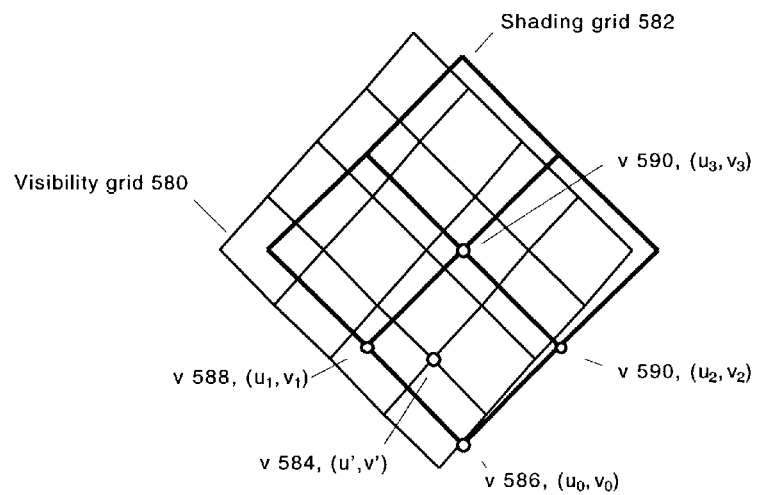

FIG. 5F illustrates an extension of the technique illustrated in FIG. 5E to two dimensions. FIG. 5F includes a visibility grid 580, a shading grid 582, vertex v 584, which is located on the visibility grid 580, and vertices v 586, v 588, v 590, and v 592, which are located on the shading grid 582. The visibility grid 580 and the shading grid 582 in this illustration were computed from a common primitive, but the visibility grid 580 includes more vertices, edges, polygons, etc. In other words, the shading grid 582 has a coarser resolution than the visibility grid 580.

In a preferred embodiment, reference is made to two parametric values (e.g., one value for each dimension) (arbitrarily named u and v) associated with the vertex v 584. The specific parametric values associated with the vertex v 584 are (u', v').

The renderer 23 preferably locates four vertices on the shading grid 582 that encompass the vertex v 584 parametrically. More specifically, the four vertices the form the smallest polygon that encompasses or overlaps the vertex v 584. In this illustration, these vertices are identified as v 586, v 588, v 590, and v 592. Parametric values $(u_0, v_0)$, $(u_0, v_1)$, $(u_1, v_0)$, and $(u_1, v_1)$ are associated with vertices v 586, v 588, v 590, and v 592, respectively. Each of these vertices also has an associated position within the object scene. Preferably, the position is given by x, y, and z coordinates (e.g., camera space coordinates).

The actual values of the parametric values (i.e., (u', v'), $(u_0, v_0)$, $(u_0, v_1)$, $(u_1, v_0)$, and $(u_1, v_1)$) are irrelevant for purposes of illustration. Suffice it to say that u' is greater than $u_0$, but less than $u_1$ and v' is greater than $v_0$, but less than $v_1$. Locating vertices on the shading grid 582 that meet this requirement, in connection with a vertex on the visibility grid 580, is a trivial operation and completed by analysis of active object scene data 32 corresponding to the primitive represented by the shading grid 582 and visibility grid 580.

After locating the four vertices (e.g., v 586, v 588, v 590, and v 592), weights for each coordinate that defines the position of the four vertices in the object scene are computed by reference to the parametric values of the vertex v 584 (e.g., (u', v')) and the four vertices (e.g., (u', v'), $(u_0, v_0)$, $(u_0, v_1)$, $(u_1, v_0)$) using the following equations:

$$pu = \frac{u' - u_0}{u_1 - u_0} \text{ and } pv = \frac{v' - v_0}{v_1 - v_0}$$

As noted above, each of the four vertices v 586, v 588, v 590, and v 592 preferably has an x, y, and z coordinate. Corresponding coordinates from each of these vertices are weighted by the pu and pv values, and then combined to form a coordinate for a position on the shading grid 582 that corresponds to the vertex v 584. The following equations are preferably used for this computation:

$$x=(1-pu)*(1-pv)*x_{v\ 586}+pu*(1-pv)*x_{v\ 590}+(1-pu)\\*pv*x_{v\ 588}+pu*pv*x_{v\ 590}$$

$$y=(1-pu)*(1-pv)*y_{v\ 586}+pu*(1-pv)*y_{v\ 590}+(1-pu)\\*pv*x_{v\ 588}+pu*pv*y_{v\ 590}$$

$$z=(1-pu)*(1-pv)*y_{v\ 586}+pu*(1-pv)*z_{v\ 590}+(1-pu)\\*pv*z_{v\ 588}+pu*pv*z_{v\ 590}$$

The above three equations use a particular bilinear interpolation, but other techniques are possible and within the scope of the present invention.

Another embodiment that addresses the problems illustrated in FIGS. 5A and 5B includes the use of bounding boxes to ensure that two objects do not overlap before using a shading grid to intersect rays. More specifically, after a ray is cast from a vertex of a visibility grid, the renderer 23 executes hit tests for each shading grid in the general area of the ray's path. As noted above, such rays preferably intersect only shading grids. But in this embodiment of the present invention, visibility grids are used to perform hit tests if a bounding box of the shading grid overlaps a bounding box of the visibility grid from which a ray is cast. With respect to FIG. 5A, the renderer 23 trivially rejects the shading grid and does not use it to perform a hit test. With respect to FIG. 5B, the second shading grid overlaps the visibility grid of the first object, so the bounding boxes of these primitives will also overlap and the renderer 23 will use the second visibility grid to perform a hit test in conjunction with the ray 544. As a result, the ray 542 does not invalidly bypass the object modeled by the second shading and visibility grids.

Figure 6A:
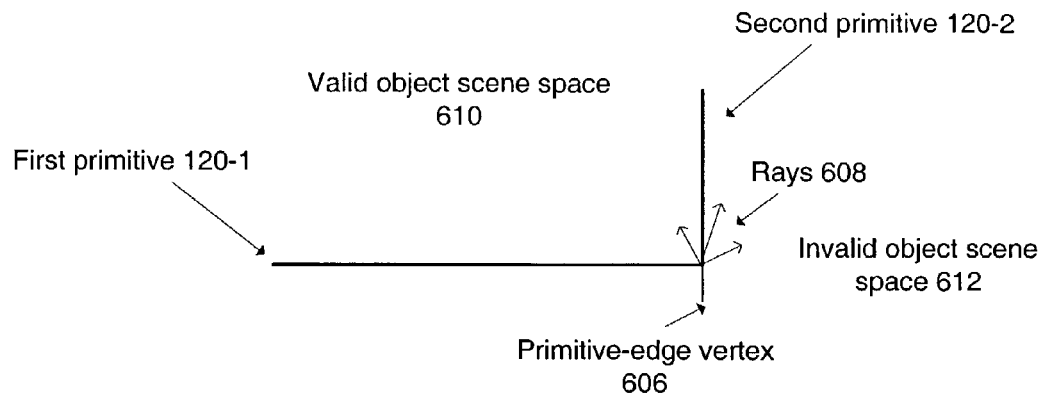
FIG. 6A illustrates a problem that may arise when tracing rays into an object scene from a primitive-edge vertex.

Embodiments of the present invention also address a problem that often occurs when casting rays from vertices of primitives (either visibility grids or shading grids). In prior art REYES architectures, and in some embodiments of the present invention, primitives are shaded without information about the locations of other primitives. As a result, rays cast from a primitive may enter invalid object scene space 612 (FIG. 6A). FIG. 6A is illustrative of this problem and includes a side-view of two flat, perpendicular primitives 120 (i.e., the first and second primitive) that abut each other along a common edge that includes the primitive-edge vertex designated 606, a set of rays 608 cast from the primitive-edge vertex 606, valid object scene space 610, and invalid object scene space 612. In this example, the two primitives 120 model the surface a common object. The space to the right of the two primitives 120 is an interior cavity of the common object and should not, therefore, be checked for possible sources of direct and indirect light for the primitive-edge vertex 606.

But since the renderer 23 does not typically have information about the location of the second primitive, the renderer 23 may cast rays directly into the invalid object scene space 612, as illustrated in FIG. 6A, while shading the primitive-edge vertex 606 for the first primitive. Such rays typically return color values that produce invalid shadows along edges of a primitive.

To avoid this problem, the renderer 23 preferably offsets the origin of the set of rays 608 so that the rays 608 can not be cast directly into the invalid object scene space 612. Any direction that will not result in a ray being invalidly cast through the surface of the first primitive will also not result in a ray being cast directly into the invalid object scene space 612.

Figure 6B:
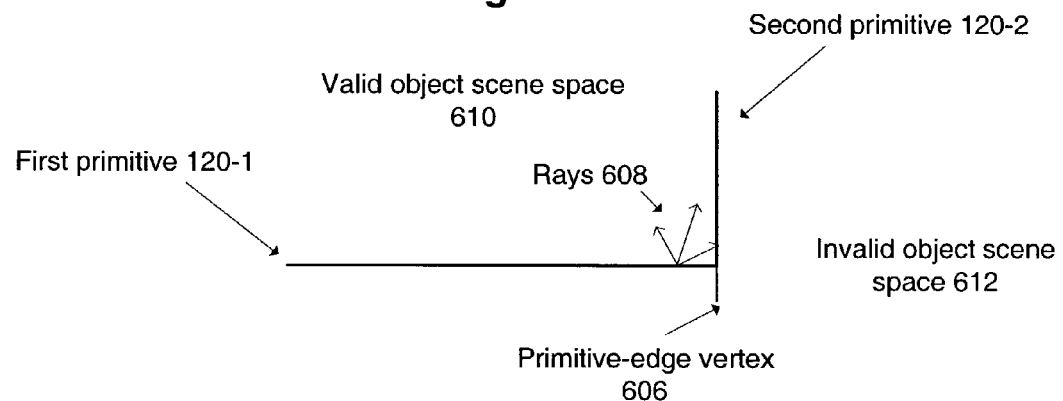
FIGS. 6B and 6C illustrate solutions, which are consistent with embodiments of the present invention, for the problem illustrated in FIG. 6A.
Figure 6C:
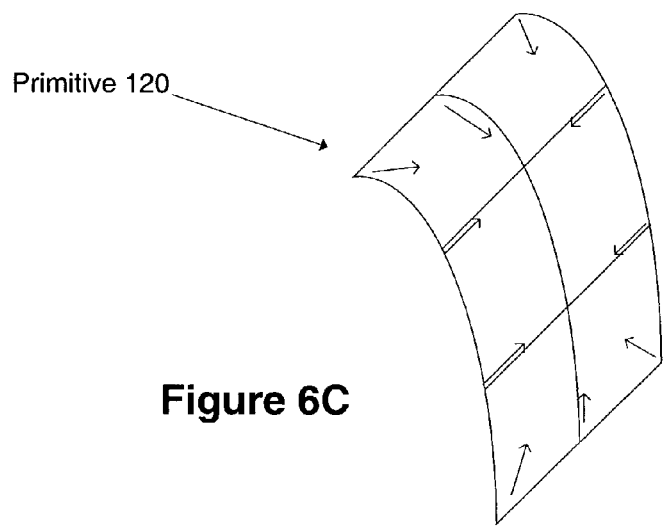

FIGS. 6B and 6C illustrate ray origin shifting. FIG. 6B illustrates a result of shifting the origin of the rays 608 illustrated in FIG. 6A away from the primitive-edge vertex 606. In this particular example, each ray origin is shifted to the same location. This is not, however, a limitation of the present invention. In some embodiments, one or more of the rays may be shifted to a unique location. FIG. 6C illustrate the general direction that ray origins are shifted for a primitive comprised of six polygons in an embodiment of the present invention.

The amount by which the rays are shifted can be determined in a number of ways without departing from the scope of the present invention. In some embodiments, for example, the amount may be fixed for all ray origins shifted (even though the direction of the shift may vary for each ray). In other embodiments, the amount of a shift is a function of a distance between the primitive-edge vertex and surrounding vertices.

As noted above, rays are used to determine light that shines on a primitive. Colors or color values computed for the vertices of a primitive are then combined to form a color value for the entire primitive.

In some embodiments, the color values computed for the vertices are bilinearly interpolated to form a color value for primitives. Persons skilled in the art recognize that interpolation is the process of determining plausible in-between values by reference to explicit values at particular points. Linear means that the values fall along a line from one known point to the next. This means the value changes a fixed amount for a fixed-sized step. Bi-linear means this process is carried out in two dimensions.

However, the light detected by the rays 608 in FIG. 6B does not correspond precisely to the light that actually falls on the primitive-edge vertex 606. So in some embodiments, the location of the new ray origin for the rays 608 is an input to the bi-linear interpolation process described above. In still other embodiments, other vertices of the primitive are used in conjunction with the location of a new ray origin for the rays 608 to extrapolate a color value for the primitive-edge vertex 606. In yet another embodiment, the light energy detected by the rays 608 is treated as if it were detected by rays with an origin at the primitive-edge vertex 606.

As noted above, the step of shading a visibility grid may include casting rays into the object scene for intersection with shading grids. Determining whether a ray intersects an object may include several steps. If a shading grid has been created for a modeled object in an object scene, the renderer first determines whether the ray intersects a bounding box of the primitive corresponding to the object. If so, the renderer 23 determines whether the ray intersects the bounding box of the shading grid, which typically requires substantially more processing time than determining whether the ray intersects the bounding box of the primitive corresponding to the object. It may be, however, that a shading grid has not yet been created such that determining whether a ray intersects a primitive also includes creating a shading grid so that a bounding box for the shading grid can be computed. For this reason, a shading grid may be created before a visibility grid of a corresponding primitive. In other words, a ray may intersect a primitive before the primitive is hidden in step 258.

After shading the visibility grid corresponding to the selected primitive or portion of a primitive (step 256) or if the visibility grid corresponding to the selected primitive or portion of a primitive is already shaded (step 254-Yes), the renderer hides the visibility grid corresponding to the selected primitive or portion of a primitive (step 258). This step typically includes the renderer 23 projecting the visibility grid onto the image plane and sampling the visibility grid. In other words, the renderer 23 determines elements of the visibility grid that are actually visible or contribute color values to one or more pixels. The renderer 23 may use a number of sampling techniques without departing from the scope of the present invention. For example, the renderer 23 may sample the visibility grid with points, lines, or areas. The renderer 23 may also use area averaging to compute primitive visibility and colors for pixels.

Figure 7:
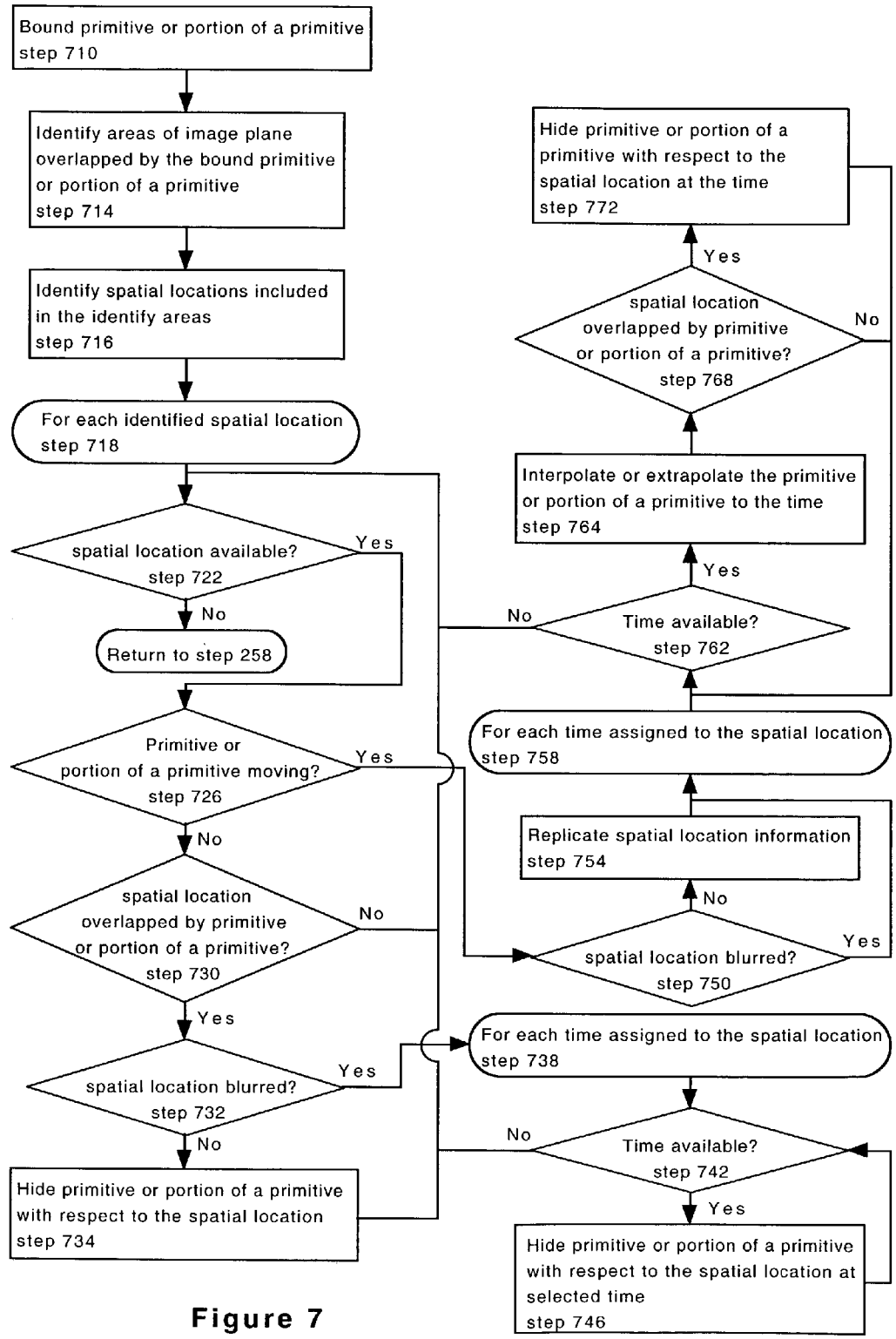
FIG. 7 illustrates processing steps for simulating motion blur in a manner consistent with an embodiment of the present invention.

FIG. 7 illustrates sub-steps taken by the renderer 23 during step 258 to simulate motion blur efficiently in an object scene. In a first sub-step, the renderer bounds the selected primitive or portion of a primitive (step 710). Similar to step 216 described above, step 710 includes the renderer 23 bounding the selected primitive or portion of a primitive in a bounding box that represents the maximum dimensions of the selected primitive or portion of a primitive and it's projected range of motion, if any, during an object scene.

The renderer 23 then identifies areas of the image plane 110 (at least partially) overlapped by the bounding box (step 714). In preferred embodiments of the present invention, these areas correspond to pixels. In other embodiments, these areas correspond to, for example, sub-pixels (e.g., previously defined sections of a pixel) or the areas assigned to primitive buckets 36. In still other embodiments, the renderer 23 may instead identify samples (at least partially) overlapped by the bounding box.

The renderer 23 then identifies spatial locations, which are defined in a sample buffer 38, included in the areas of the image plane 110 identified in step 714 (step 716). The renderer 23 may accomplish this task by scanning a sample buffer 38 to identify spatial location fields 130 set to values that fall within the identified areas of the image plane 110. In point sampling embodiments, step 716 is trivial. In other embodiments (e.g., line and area sampling embodiments), the process is more complex since one or more dimensions must be considered (e.g., one dimension for line sampling and two dimensions for area sampling). If step 714 includes identifying spatial locations overlapped by the bounding box instead of areas overlapped by the bounding box, step 716 is not necessary.

The renderer 23 then executes a series of steps to sample (step 722), or attempt to sample, the selected primitive or portion of a primitive (e.g., steps 726-772) from the identified spatial locations.

If no spatial locations are identified or after all of the identified spatial locations have been processed (e.g., subjected to some or all of steps 726-772) (step 722-No), the renderer returns to step 258 to continue execution of step 258 and subsequent/additional steps.

But if one or more spatial locations are identified in step 716 and at least one spatial location has not yet been processed (step 722-Yes), the renderer 23 determines whether the selected primitive or portion of a primitive is moving (step 726). This step is typically accomplished by reference to the loaded primitive data 34. The result of this determination is preferably maintained in a high speed section of the memory 20 (e.g., RAM) to avoid accessing low speed sections of the memory during subsequent executions of step 726 (e.g. a flag is set) for the selected primitive or portion of primitive.

If the selected primitive or portion of a primitive is not moving (step 726-No), the renderer 23 determines whether the selected primitive or portion of a primitive overlaps a spatial location available in step 722 (i.e., the selected spatial location) (step 730). If not (step 730-No), the renderer returns to step 722 to check for, and possibly process, another spatial location.

But if the selected primitive or portion of a primitive does overlap the selected spatial location (step 730-Yes), the renderer 23 determines whether the spatial location is blurred (step 732). A spatial location is blurred if color/transparency/depth triplets have been computed at specific temporal locations or times during the object scene for the spatial location. As noted above, preferred embodiments of the present invention use the sample buffer 38 illustrated in FIG. 1C. And again, this sample buffer 38 includes a time pointer field 135 for each spatial location (i.e., each entry in the sample buffer 38). If the time pointer field 135 is set to NULL, the selected spatial location is not blurred. But if the time pointer field 135 is instead set to a valid pointer, the selected spatial location is blurred.

If the selected spatial location is not blurred (step 732-No), the renderer 23 hides the selected primitive or portion of a primitive with respect to the selected spatial location (step 734). Typically, step 734 includes determining whether the selected primitive or portion of a primitive is hidden by previously selected primitives or portions of primitives that also overlap the selected spatial location. Making this determination includes the computation of one or more depth values (e.g., distance from the image plane 110) for the selected primitive or portion of a primitive and comparing these one or more depth values to the one or more depth values maintained in the sample buffer 38 for the selected spatial location.

If this comparison indicates that the selected primitive or portion of a primitive is not hidden, the renderer 23 computes one or more color values and transparency values for the selected primitive or portion of a primitive. The use of this information depends upon the specific results of the comparison.

If the selected primitive or portion of a primitive is opaque and the comparison indicates that the selected primitive or portion of a primitive is closer to the image plane 110 than all previously selected primitives or portions of primitives that also overlap the selected spatial location, the corresponding transparency pointer field is set to NULL, if it is not already, and any additional data storage allocated to color/transparency/depth triplets computed for the selected spatial location is deallocated. Information contained in this storage, if there is any, is no longer needed since the corresponding primitives are hidden by the selected primitive or portion of a primitive.

If the selected primitive or portion of a primitive is opaque and the comparison indicates that the selected primitive or portion of a primitive is not closer to the image plane 110 than all previously selected primitives or portions of primitives that also overlap the selected spatial location, the renderer 23 checks depth values stored in the sample buffer 38 to identify a visible, previously selected primitive or portion of a primitive with a depth or depths greater than those of the selected primitive or portion of a primitive that is also closer to the image plane than all other visible, previously selected primitives or portions of primitives with depths greater than those of the selected primitive or portion of a primitive. If such a primitive or portion of a primitive is located, the renderer 23 inserts the color/transparency/depth triplet computed for the selected primitive or portion of a primitive into the storage corresponding to this primitive. The renderer 23 may then set the corresponding transparency pointer field to NULL and deallocate additional information for all of the color/transparency/depth triplets with corresponding depths greater than those of the selected primitive or portion of a primitive. This information is no longer needed since the corresponding primitives are no longer visible from the selected spatial location. And if such a primitive or portion of a primitive is not located, the renderer 23 copies the color/transparency/depth triplet computed for the selected primitive or portion of a primitive into newly allocated additional data storage. The renderer 23 then sets the transparency pointer field corresponding to what was the last color/transparency/depth triplet with the greatest depth value to point to the newly allocated additional data storage.

If the selected primitive or portion of a primitive is semi-transparent or transparent, the renderer 23 copies the color/transparency/depth triplet computed for the selected primitive or portion of a primitive into newly allocated additional data storage and checks depth values stored for the selected spatial location to identify a visible, previously selected primitive or portion of a primitive with a depth or depths greater than those of the selected primitive or portion of a primitive that is also closer to the image plane than all other visible, previously selected primitives or portions of primitives with depths greater than those of the selected primitive or portion of a primitive. The renderer 23 then sets the pointer of the transparency pointer field corresponding to the newly allocated additional data storage to point to the color/transparency/depth triplet corresponding to the identified primitive or portion of a primitive. The renderer 23 also sets the pointer of the transparency pointer field corresponding to the primitive or portion of a primitive that preceded the identified primitive or portion of a primitive to point to the newly allocated additional data storage.

In embodiments that use samples with one or more dimensions (e.g., line samples, area samples, etc.), the selected primitive or portion of a primitive may overlap only a portion of the selected spatial location and/or be visible from the image plane 110 for only a portion of the selected spatial location. If so, step 734 may include creating an additional entry in the sample buffer 38 to accommodate information for specific portions of the selected spatial location. The step of creating an additional entry may include copying information from the original entry in the sample buffer 38 corresponding to the selected spatial location into a new entry and adjusting the value or values stored in the respective location 130 entries to restrict them to a respective spatial location. After one or more additional entries are created, they may be processed separately along with the spatial locations identified in step 716. The renderer 23 may then continue processing the entry selected in step 722 (i.e., a portion of the originally selected spatial location).

The process of hiding a primitive with respect to a spatial location is described in more detail in the U.S. patent application bearing Ser. No. 09/865,990, entitled "SYSTEM AND METHOD OF LINE SAMPLING OBJECT SCENE INFORMATION", and commonly assigned with the present invention and the U.S. patent application Ser. No. 10/157,579, filed on May 28, 2002, entitled "SYSTEM AND METHOD RELATED TO DATA STRUCTURES IN THE CONTEXT OF A COMPUTER GRAPHICS SYSTEM", and commonly assigned with the present invention, which are both incorporated herein by reference.

After executing step 734, the renderer 23 returns to step 722 to check for, and possibly process, another spatial location.

But if the selected spatial location is blurred (step 732-Yes), the renderer 23 executes the step of hiding the selected primitive or portion of a primitive with respect to the selected spatial location at each time stored with the entry corresponding to the selected spatial location (step 738). As noted above, in preferred embodiments, blurred spatial locations include color/transparency/depth triplets computed for specific temporal locations or times during an object scene or image frame.

The renderer 23, therefore, checks for an available temporal location or time (step 742). In other words, the renderer 23 checks for a time assigned to the selected spatial location and maintained in a corresponding temporal location field 138 that has not yet been processed in connection with the selected primitive or portion of a primitive.

If a temporal location or time is available (step 742-Yes), the renderer 23 selects the temporal location or time for processing and hides the selected primitive or portion of a primitive with respect to the selected spatial location at the selected time (step 746).

Additionally, step 746 is essentially identical to step 734 described above with the exception that the hide step is executed by reference color/transparency/depth triplets computed at specific times for the selected spatial location. It is important to point out again, that if the spatial location is blurred, it is overlapped by a moving object. The moving object may overlap the spatial location at one instant, but not at another. As a result, the color/transparency/depth triplets computed at specific times for the selected spatial location may not be identical.

After executing step 742 and 746 for each temporal location or time maintained for the selected spatial location, none, some, or all of the color/transparency/depth triplets of the selected spatial location may have been modified. In some embodiments of the present invention, an additional step is taken to reduce the amount of memory 20 dedicated to the selected spatial location. Specifically, the renderer 23 determines whether the color/transparency/depth triplets computed at each temporal location or time maintained for the selected spatial location are identical. If so, the renderer deallocates additional data storage pointed to by a pointer stored in the time pointer field corresponding to the selected spatial location and sets this field to NULL. In other words, the renderer 23 may collapse the sample buffer 38 entry for the selected spatial location if the color/transparency/depth triplets computed at each temporal location or time maintained for the selected spatial location are identical.

If each of the color/transparency/depth triplets are identical, the selected spatial location is not blurred even though it overlaps a moving primitive. It may be that the selected primitive or portion of a primitive, which is not moving if step 746 is executed, is opaque and closer to the image plane than previously selected primitives or portions of primitives that also overlap the selected spatial location. In other words, these previously selected primitives or portions of primitives that also overlap the selected spatial location are not actually visible from the selected spatial location at the times processed.

But because only a limited number of times were checked, it is possible that at other times during an object scene or image frame, color/transparency/depth triplets computed for the selected spatial location may not be identical. The renderer 23, therefore, preferably maintains the times selected for the selected spatial location for reuse when subsequently processing a moving primitive that overlaps the selected spatial location. In other words, computations made for one time are not applicable to another time.

The renderer 23 then returns to step 722 to check for, and possibly process, another spatial location.

But if the selected primitive or portion of a primitive is moving (step 726-Yes), the renderer 23 determines whether the selected spatial location is blurred (step 750). If the selected spatial location is not blurred (step 750-No), the renderer 23 replicates existing sample information (step 754). In other words, the renderer 23 expands an entry in the sample buffer 38 corresponding to the selected spatial location. This step typically includes allocating space in the memory 20 for additional data storage that will be pointed to by the pointer stored in the time pointer field corresponding to the selected spatial location and setting the pointer field to point to this newly allocated space. The amount of space allocated depends upon the number of times the object scene will be sampled from the selected spatial location during the object scene or image frame. This step also typically includes copying the contents of the color field 132, the transparency field 133, the depth field 134, and the one or more linked lists pointed to by the pointer stored in the transparency pointer field 136 into the newly allocated additional data storage. Further, the renderer 23 inserts sample times into each, newly allocated temporal location field 138 and each additional temporal location field created during this step. As noted above, in some embodiments of the present invention, an entry in the sample buffer 38 for a spatial location may be collapsed. If this step was taken for the selected spatial location, the times previously stored in the collapsed entry are preferably reused. If not, the renderer 23 preferably selects unique times for each of the temporal location fields. More specifically, the renderer 23 preferably selects these times randomly, pseudo randomly, or quasi randomly. Selecting times in this fashion avoids visual artifacts that may result from using other techniques for selecting times.

If the sample position is blurred (step 750-Yes) or after executing step 754, the renderer 23 hides the selected primitive or portion of a primitive with respect to the selected spatial location at each time assigned to the selected spatial location (step 758).

More specifically, the renderer 23 checks for an available temporal location or time (step 762). If a time is available (step 762-Yes), the renderer selects the time and interpolates or extrapolates the position of the selected primitive or portion of a primitive from an initial position at the beginning of an object scene or image frame to a position corresponding to the selected time (step 764). As noted above, the active object scene data 32 includes information about the movement of a primitive during an object scene or image frame. More specifically, the active object scene data 32 may include the position of the selected primitive or portion of a primitive at the beginning of the object scene or image frame and, for example, the velocity and trajectory of the selected primitive or portion of a primitive during the object scene or image frame or the position of the selected primitive or portion of a primitive at the end of the object scene or image frame. Using this information, the renderer 23 may compute the position of the selected primitive or portion of a primitive (i.e., the vertices of the selected primitive or portion of a primitive) for a specific time during the object scene or image frame.

After executing step 764, the renderer 23 determines whether the selected spatial location is overlapped by or overlaps the selected primitive or portion of a primitive (step 768). If not (step 768-No), the renderer returns to step 762 to check for, and possibly process, another time assigned to the selected spatial location.

But if the selected spatial location is overlapped by or overlaps the selected primitive or portion of a primitive at the selected time (step 768-Yes), the renderer 23 hides the selected primitive or portion of a primitive with respect to the selected spatial location (step 772). Step 772 is essentially identical to step 746 described above. One exception is that color/transparency/depth triplets computed for the selected primitive or portion of a primitive may not be used at other times assigned to the selected spatial location. Because the selected primitive or portion of a primitive is moving, these values may be invalid at other times.

After executing step 772, and possibly modifying, adding, or deleting color/transparency/depth triplets maintained for the selected spatial location, the renderer 23 returns to step 762 to check for, and possibly process, another time assigned to the selected spatial location.

As described above in connection with steps 742 and 746, the renderer 23 may collapse the sample buffer 38 entry for the selected spatial location if color/transparency/depth triplets computed at specific times are identical. And again, the renderer 23 preferably maintains the times selected for the selected spatial location for reuse when subsequently processing a moving primitive that overlaps the selected spatial location.

The renderer 23 then returns to step 722 to check for, and possibly process, another spatial location.

The result of the hiding step, including those sub-steps illustrated in FIG. 7, is typically a plurality of color values maintained by the renderer 23 in the sample buffers 38. These color values may or may not be subsequently overwritten by the renderer 23 following another execution of the hiding step (step 258) in conjunction with other visibility grids. Such visibility grids may actually be closer to the image plane 110 than the (current) visibility grid and, therefore, occlude the (current) visibility grid.

After hiding the visibility grid corresponding to the selected primitive or portion of a primitive, the renderer 23 preferably removes the pointer to the selected primitive or portion of a primitive from its primitive bucket 36 (step 260).

The renderer 23 then determines whether the selected primitive or portion of a primitive is still on-screen (step 262). The step of shading the visibility grid may offset vertices of the visibility grid such that it is no longer in the viewing volume. As a result, step 262 includes bounding the shaded visibility grid corresponding to the selected primitive or portion of a primitive and determining whether the resulting bounding box is on-screen.

If the renderer 23 determines that the selected primitive or portion of a primitive is not still on-screen (step 262-No), the renderer 23 removes all pointers to the selected primitive or renderer 23, for example, also determines in step 262 that the entire primitive that includes the selected portion is not still on-screen, the renderer 23 may remove all pointers to this primitive from the primitive buckets 36.

The renderer 23 then preferably culls corresponding visibility grids from the active object scene data 32 (step 264). At the very least, a visibility grid created for the selected primitive or the selected portion of a primitive is removed. But if the renderer 23 determines in step 262 that the primitive that includes the selected portion is not still on-screen, the renderer 23 may remove all visibility grids created for this primitive.

The renderer 23 then determines whether the selected primitive or portion of a primitive is ray traceable (step 266). If the renderer 23 determines that the selected primitive or portion of a primitive is ray traceable (step 226-Yes), the renderer 23 returns to step 208 to select another primitive or portion of a primitive. Since the selected primitive or portion of a primitive may be intersected by a ray while the renderer 23 is shading another primitive, data about the selected primitive or portion of a primitive is preferably maintained.

If the renderer 23 determines that the selected primitive or portion of a primitive is not ray traceable (step 266-No), the renderer 23 culls data related to the selected primitive or the primitive that includes the selected portion from the active object scene data 32 (except, for example, an indication that the selected primitive or the primitive that includes the selected portion has already been processed) (step 268). The renderer 23 then returns to step 208 to select another primitive or portion of a primitive.

Figure 2D:
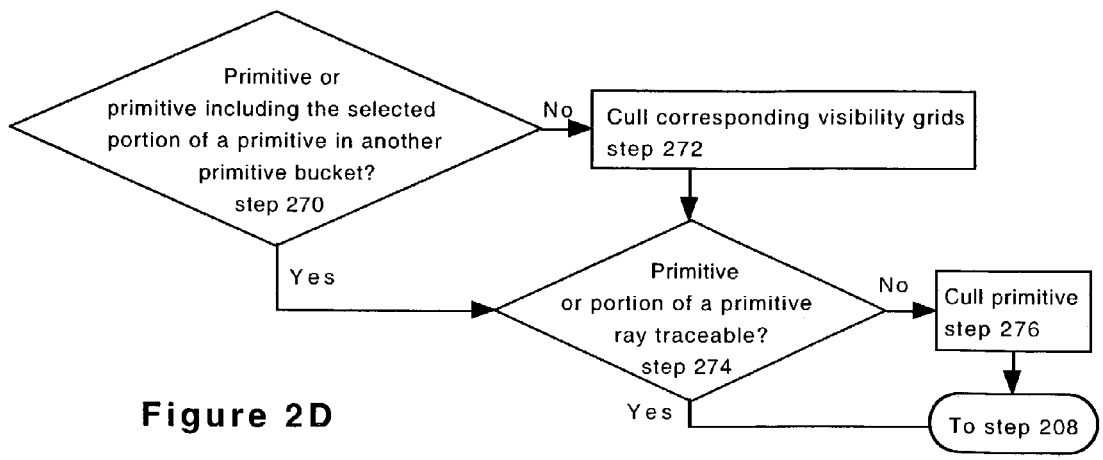

If the renderer 23 determines that the selected primitive or portion of a primitive is still on-screen (step 262-Yes), the renderer 23 determines whether the selected primitive or the primitive that includes the selected portion is referenced in any primitive buckets 36 (step 270, FIG. 2D). If not (step 270-No), the renderer 23 culls the visibility grid created for the selected primitive or the selected portion of a primitive (step 272).

But if the selected primitive or the primitive that includes the selected portion is referenced in any primitive buckets 36 (step 270-Yes) or after executing step 272, the renderer 23 determines whether the selected primitive or portion of a primitive is ray traceable (step 274). If the renderer 23 determines that the selected primitive or portion of a primitive is ray traceable (step 274-Yes), the renderer 23 returns to step 208 to select another primitive or portion of a primitive. Since the selected primitive or portion of a primitive may be intersected by a ray while the renderer 23 is shading another primitive, data about the selected primitive or portion of a primitive is preferably maintained.

If the renderer 23 determines that the selected primitive or portion of a primitive is not ray traceable (step 274-No), the renderer 23 culls data related to the selected primitive or the primitive that includes the selected portion from the active object scene data 32 (except, for example, an indication that the selected primitive or the primitive that includes the selected portion has already been processed) (step 276). The renderer 23 then returns to step 208 to select another primitive or portion of a primitive.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, in some embodiments of the present invention, the renderer 23 may order a given primitive bucket to process non-moving primitives before processing moving primitives. Additionally, some of these embodiments, may order the moving primitives by speed of movement and/or distance from the image plane 110. More specifically, the renderer 23 may order the moving primitives so that the fastest moving primitives are processed first. This enables the renderer 23 to, among other things, dynamically determine the number of times to sample from a spatial location during an object scene. If the fastest moving primitives does not move very fast, it may be that, for example, sampling the object scene twice from a given spatial location overlapped by the primitive is sufficient. Similarly, if the fastest moving primitives does move very fast, it may be that, for example, sampling the object scene four times from a given spatial location overlapped by the primitive is required.

The present invention can be implemented as a computer program product that includes a computer program mechanism embedded in a computer readable storage medium. For instance, the computer program product could contain the program modules shown in FIG. 1A. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

What is claimed is:

1. A method of generating an image frame comprising:
for each of a plurality of spatial locations:
selecting a spatial location in the plurality of spatial locations;
selecting one or more primitives, and if at least one primitive overlaps the spatial location at a temporal location during the image frame; then
determining whether at least one overlapping primitive is moving; and if no overlapping primitive is moving, then
determining and storing at least one color value and depth value only at a single temporal location; otherwise, if an overlapping primitive is moving, then
determining and storing color values and depth values corresponding to two or more temporal locations in the image frame; and
generating an image frame using, at least in part, the one or more color values stored for each of the plurality of spatial locations.

2. The method of claim 1 further comprising:
for the spatial location:
selecting a primitive, and if the primitive overlaps the spatial location at a temporal location during the image frame; then
determining whether the primitive is moving; and if the primitive is not moving, then
determining whether the primitive is visible at the spatial location; otherwise, if the primitive is moving, then
determining whether the primitive is visible at the spatial location for each of the two or more temporal locations.

3. The method of claim 1 wherein the two or more temporal locations are pseudo-randomly selected.

4. The method of claim 1 wherein the two or more temporal locations are quasi-randomly selected.

5. The method of claim 1 wherein the two or more temporal locations are randomly selected.

6. The method claim 1 wherein the color values and depth values are stored in a sample buffer.

7. The method of claim 6 wherein color values and depth values corresponding to two or more temporal locations in the image frame are stored as a linked list.

8. The method of claim 7 wherein a pointer, stored in a same entry as a first color value and a first depth value at a first temporal location, points to a location where a second color value and a second depth value at a second temporal location are stored.

9. The method of claim 8 wherein a first temporal location field and a second temporal location field are also stored in the location with the second color value and the second depth value.

10. The method of claim 1 wherein if the primitive is moving, color values and depth values for four temporal locations are determined and stored.

11. The method of claim 10 wherein the four temporal locations are pseudo-randomly selected.

12. The method of claim 1 wherein the moving overlapping primitive is required to be visible during at least one temporal location in the image frame before determining and storing color values and depth values corresponding to two or more temporal locations in the image frame.

13. The method of claim 1 further comprising:
   determining whether color/transparency/depth triplets computed at each temporal location or time maintained for the selected spatial location are identical; and
   if the triplets are identical, deallocating memory for all but one triplet.

14. The method of claim 1 further comprising:
   hiding a first overlapping primitive at a particular spatial location at each applicable temporal location.

15. The method of claim 14 wherein hiding the first overlapping primitive comprises:
   determining whether the first overlapping primitive or portion of the overlapping primitive is bidden by one or more previously analyzed primitives or portions of primitives that also overlap the selected spatial location.

16. The method of claim 15 wherein hiding the first overlapping primitive further comprises:
   if the overlapping primitive is opaque and has less depth than at least one other overlapping primitive, inserting a color/transparency/depth triplet into the data structure for overlapping primitive with the next largest depth value and deallocating data structures for other overlapping primitives for that spatial location.

17. The method of claim 16 wherein the deallocating is performed by setting a transparency pointer to NULL.

18. The method of claim 1 wherein determining whether at least one overlapping primitive is moving is accomplished by determining if a time pointer has a value of NULL.

19. A method of generating an image frame comprising:
   at a spatial location in the image frame:
      if a first primitive overlaps the spatial location at a temporal location during the image frame; ten determining whether the primitive is moving; and
      if the first primitive is not moving, then determining depth value only at a single temporal location for the first primitive; and
      if the primitive is moving, then determining depth values corresponding to two or more temporal locations in the image frame for the first primitive; and
   generating an image frame using at least in part the one or more depth values determined for that spatial location.

20. The method of claim 19 further comprising:
   for the spatial location:
      selecting a primitive, and if the primitive overlaps the spatial location at a temporal location during the image frame; then
         determining whether the primitive is moving; and if the primitive is not moving, then
            determining whether the primitive is visible at the spatial location; otherwise, if the primitive is moving, then
               determining whether the primitive is visible at the spatial location for each of the two or more temporal locations.

21. The method of claim 19 wherein the two or more temporal locations are pseudo-randomly selected.

22. The method of claim 19 wherein the two or more temporal locations are quasi-randomly selected.

23. The method of claim 19 wherein the two or more temporal locations are randomly selected.

24. The method claim 19 wherein the color values and depth values are stored in a sample buffer.

25. The method of claim 24 wherein color values and depth values corresponding to two or more temporal locations in the image frame are stored as a linked list.

26. The method of claim 25 wherein a pointer, stored in a same entry as a first color value and a first depth value at a first temporal location, points to a location where a second color value and a second depth value at a second temporal location are stored.

27. The method of claim 26 wherein a first temporal location field and a second temporal location field are also stored in the location with the second color value and the second depth value.

28. The method of claim 19 wherein if the primitive is moving, color values and depth values for four temporal locations are determined and stored.

29. The method of claim 28 wherein the four temporal locations are pseudo-randomly selected.

30. The method of claim 19, further comprising:
   determining of the first primitive is visible;
   computing a color/transparency/depth triplet when the first primitive is visible.

31. The method of claim 30, further comprising:
   if the first primitive is opaque and has less depth than at least one other overlapping primitive, inserting the color/transparency/depth triplet into the data structure for overlapping primitive with the next largest depth value and deallocating data structures for other overlapping primitives for that spatial location.

32. The method of claim 31 wherein the deallocating is performed by setting a transparency pointer to NULL.

33. The method of claim 19 wherein determining whether at least one overlapping primitive is moving is accomplished by determining if a time pointer has a value of NULL.

34. A method of generating an image frame comprising:
   selecting a plurality of point sample locations, wherein each point sample location is overlapped by at least one object;
   determining whether each point sample location is overlapped by a moving object;
   for each point sample location not overlapped by a moving object, sampling a non-moving object to determine sample data only at a single temporal location;
   for a point sample location overlapped by a moving object:
      replicating existing sample data for the point sample location;
      sampling the moving object at a plurality of temporal locations;
      updating the replicated data using the samples of the moving object; and
   generating an image frame using at least in part the sample data stored for each of the plurality of point sample locations.

35. The method of claim 34 further comprising:
   further updating the replicated data by sampling moving and non-moving objects.

36. The method of claim 35 wherein the plurality of temporal locations includes at least two temporal locations.

37. The method of claim 36 wherein the at least two temporal locations are pseudo-randomly selected.

38. The method of claim 35 wherein the plurality of temporal locations includes four temporal locations.

39. The method of claim 38 wherein the four temporal locations are pseudo-randomly selected.

40. The method of claim 34 wherein the existing sample data includes a color value and a depth value.

41. The method of claim 34 wherein the existing sample data and the replicated data are stored as linked lists.

* * * * *